United States Patent
Jyonoshita et al.

(10) Patent No.: US 9,692,881 B2
(45) Date of Patent: Jun. 27, 2017

(54) ELECTRONIC DEVICE, INFORMATION PROCESSING METHOD AND INFORMATION DISPLAY METHOD

(75) Inventors: Yasuhiro Jyonoshita, Kanagawa (JP); Takahiro Mori, Kanagawa (JP); Mayu Sanda, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 290 days.

(21) Appl. No.: 13/259,014

(22) PCT Filed: Mar. 26, 2010

(86) PCT No.: PCT/JP2010/055468
§ 371 (c)(1),
(2), (4) Date: Sep. 22, 2011

(87) PCT Pub. No.: WO2010/110459
PCT Pub. Date: Sep. 30, 2010

(65) Prior Publication Data
US 2012/0013562 A1    Jan. 19, 2012

(30) Foreign Application Priority Data

Mar. 26, 2009 (JP) ................................. 2009-077857
Mar. 26, 2009 (JP) ................................. 2009-077858

(51) Int. Cl.
*G06F 3/041* (2006.01)
*H04M 1/725* (2006.01)
*G06F 3/0488* (2013.01)

(52) U.S. Cl.
CPC ...... *H04M 1/72583* (2013.01); *G06F 3/0416* (2013.01); *G06F 3/0488* (2013.01)

(58) Field of Classification Search
CPC .... G06F 1/1616; G06F 1/1618; G06F 1/1626; G06F 1/1641; G06F 1/1647;
(Continued)

(56) References Cited

U.S. PATENT DOCUMENTS

2003/0119562 A1    6/2003    Kokubo
2006/0066582 A1    3/2006    Lyon et al.
(Continued)

FOREIGN PATENT DOCUMENTS

JP    H11-102274 A    4/1999
JP    2003162355 A    6/2003
(Continued)

OTHER PUBLICATIONS

International Search Report; PCT/JP2010/055468; Aug. 3, 2010.
(Continued)

*Primary Examiner* — Jonathan Boyd
(74) *Attorney, Agent, or Firm* — Studebaker & Brackett PC

(57) ABSTRACT

An electronic device includes a first display unit which displays information about an active application, which is an application being executed; a touch sensor which is overlapped on the first display unit and which detects a touch thereto; and a control unit which, in a state where information about the active application is being displayed on the first display unit, performs processing on the active application when a touch to the touch sensor is determined as a first touch, and executes, as the active application, another application different from the application being executed when the touch to the touch sensor is determined as a second touch which has a wider region than the first touch.

17 Claims, 19 Drawing Sheets

(58) Field of Classification Search
CPC .... G06F 1/1649; G06F 1/1662; G06F 1/1681; G06F 1/1686; G06F 1/169; G06F 2203/0331; G06F 2203/0339; G06F 3/014; G06F 3/0219; G06F 3/0416; G06F 3/0488; H04M 1/72583
USPC .......................................................... 345/173
See application file for complete search history.

(56) References Cited

U.S. PATENT DOCUMENTS

| | | |
|---|---|---|
| 2006/0066588 A1 | 3/2006 | Lyon et al. |
| 2006/0293088 A1 | 12/2006 | Kokubo |
| 2008/0094370 A1* | 4/2008 | Ording et al. ................ 345/173 |
| 2009/0158216 A1* | 6/2009 | Zhang ................ G06F 9/44505 715/835 |
| 2010/0289760 A1 | 11/2010 | Jonoshita et al. |
| 2011/0171942 A1 | 7/2011 | Kokubo |
| 2012/0162082 A1* | 6/2012 | Mori ............................ 345/168 |
| 2012/0289287 A1 | 11/2012 | Kokubo |
| 2013/0078973 A1* | 3/2013 | Kimura ........................ 455/415 |

FOREIGN PATENT DOCUMENTS

| | | | |
|---|---|---|---|
| JP | 2003173228 A | | 6/2003 |
| JP | 2003-330586 A | | 11/2003 |
| JP | 2004-178363 A | | 6/2004 |
| JP | 2005-215453 A | | 8/2005 |
| JP | 2005-323241 A | | 11/2005 |
| JP | 2007-034055 A | | 2/2007 |
| JP | 2007-079157 A | | 3/2007 |
| JP | 2007-141029 A | | 6/2007 |
| JP | 2008-084119 A | | 4/2008 |
| JP | 2008-108233 A | | 5/2008 |
| JP | 2008-252363 A | | 10/2008 |
| JP | 2009075656 A | | 4/2009 |
| KR | 10-2010-0053093 A | | 5/2010 |
| WO | 2007037806 A1 | | 4/2007 |
| WO | 2009/034982 A1 | | 3/2009 |

OTHER PUBLICATIONS

An Office Action issued by the Korean Intellectual Property Office on Apr. 26, 2013, which corresponds to Korean Patent Application No. 10-2011-7025113 and is related to U.S. Appl. No. 13/259,014, with translation.

A Japanese Office Action "Notification of Reason for Refusal" dated Apr. 2, 2013, which corresponds to Japanese Patent Application No. 2009-077857 and is related to U.S. Appl. No. 13/259,014, with translation.

An Office Action; "Notice of Reasons for Rejection," issued by the Japanese Patent Office on Mar. 18, 2014, which corresponds to Japanese Patent Application No. 2013-167800 and is related to U.S. Appl. No. 13/259,014; with English language concise explanation.

"Teach us about Mac"; Nikkei PC Beginners; Sep. 13, 2008; pp. 91-92; vol. 9, No. 13, Issue 18; Nikkei Business Publications, Inc.

An Office Action "Notice of Reasons for Rejection" issued by the Japanese Patent Office on Jun. 18, 2013, which corresponds to Japanese Patent Application No. 2009-077858 and is related to U.S. Appl. No. 13/259,014; with concise Explanation.

An Office Action "Notice of Reasons for Rejection" issued by the Japanese Patent Office on Aug. 20, 2013, which corresponds to Japanese Patent Application No. 2009-077857 and is related to U.S. Appl. No. 13/259,014; with concise Explanation.

* cited by examiner

DETERMINE AS A WIDE
REGION FOR TOUCH
ON A PLURALITY OF PARTS

DETERMINE AS A NARROW
REGION FOR TOUCH
ON A SINGLE PART

DETERMINE WHETHER THE TOUCH IS MADE IN
A NARROW REGION OR WIDE REGION BY
AN AREA OF AN OUTER EDGE REGION 132a

DETERMINE WHETHER THE TOUCH IS
MADE IN A NARROW REGION OR WIDE
REGION BY A TOUCH AREA ON
THE TOUCH SENSOR 132

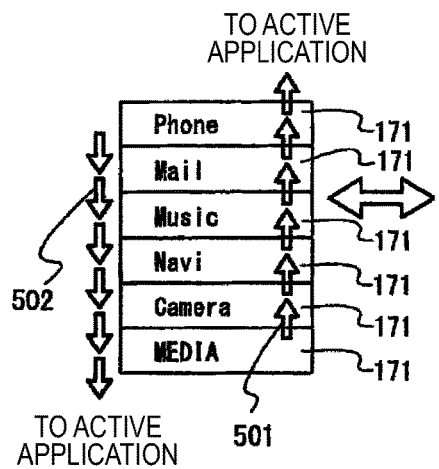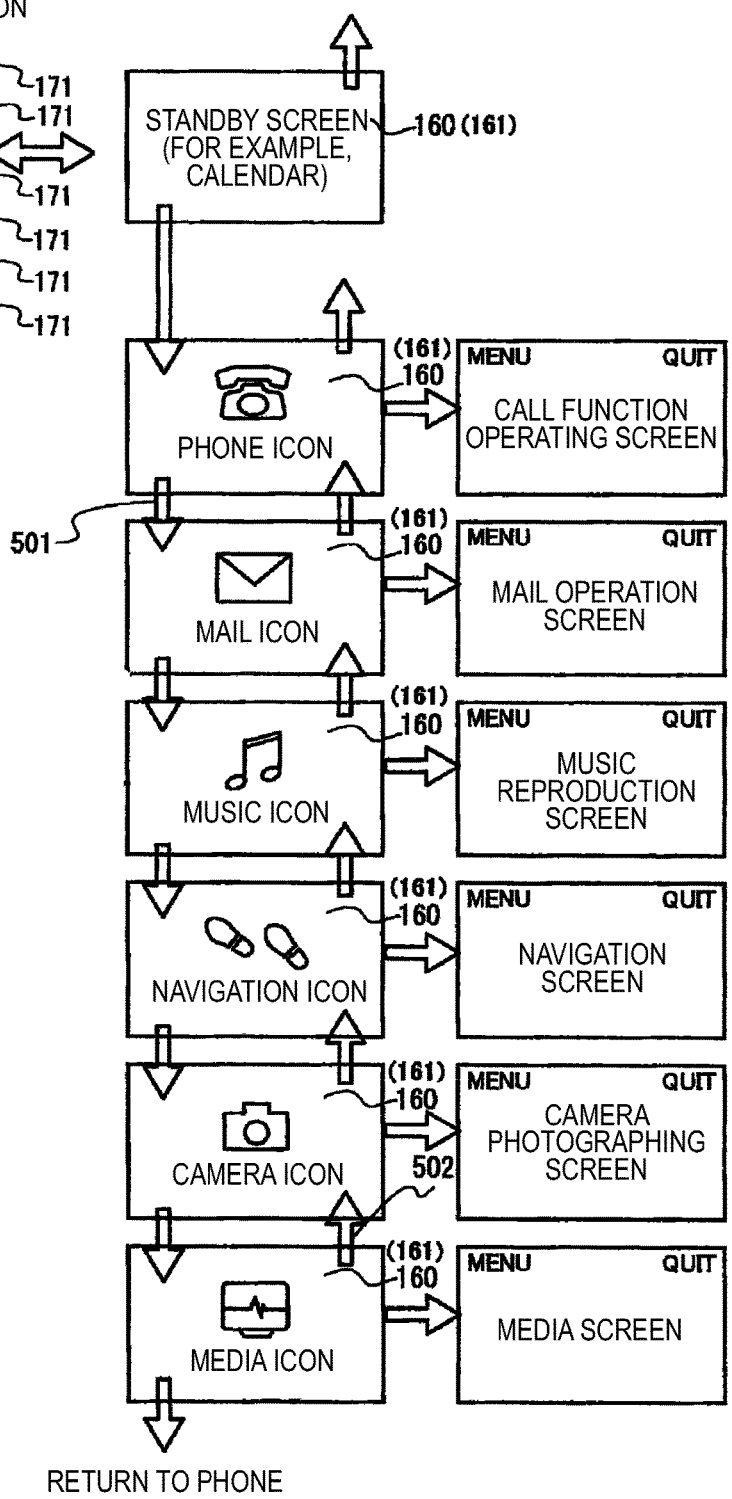

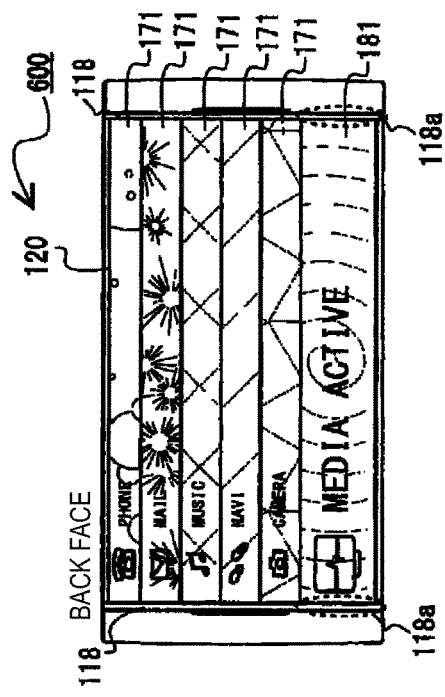
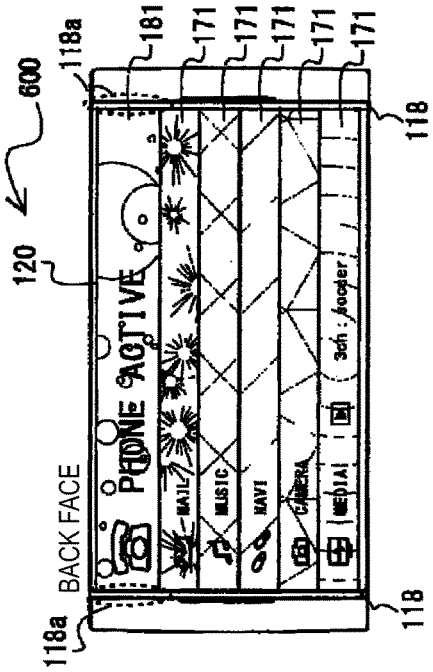
FIG. 16(a)
FIG. 16(b)
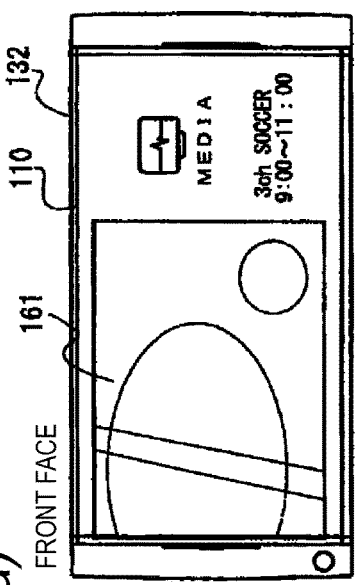
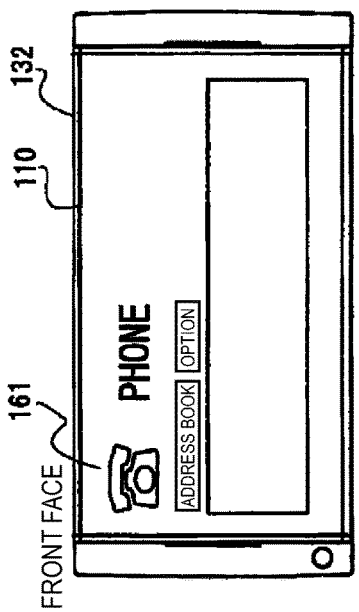

ELECTRONIC DEVICE, INFORMATION PROCESSING METHOD AND INFORMATION DISPLAY METHOD

TECHNICAL FIELD

The present invention relates to an electronic device that has a touch sensor as an information input means.

BACKGROUND ART

In recent years, electronic devices such as cellular phone, PHS (Personal Handy phone System), PDA (Personal Digital Assistant) and the like have been size-reduced, weight-reduced and highly-functionalized. As a result, not only the communication-related functions such as calling and mailing but also the functions comparable to a computer, such as camera, music reproduction, television and the like have been embedded therein.

Accompanied with the high-functionalization, there are needs for increasing a screen size of a display area so as to use various applications comfortably. However, since a size of a housing is limited in an electronic device that is being miniaturized, an area that is allotted to an operation unit is inevitably reduced in attempts to increase the screen size of the display area. Accordingly, the same operation key should be assigned with various functions or a hierarchy of menus should be deepened, so that the operability is lowered.

Patent Document 1 discloses a technique in which a first touch sensor is provided on the same face as a screen (information display screen) and a second touch sensor is provided on an opposite face and is used as an auxiliary input means for fingerprint authentication and the like.

PRIOR ART DOCUMENTS

Patent Documents

Patent Document 1: JP 2007-141029A

SUMMARY OF THE INVENTION

Problems to be Solved

In the configuration of Patent Document 1, the input means is arranged on the back face that has not been conventionally used. However, the input means on the back face is simply used as an auxiliary means of the input means on the surface so as to improve the operability.

The present invention has been made in view of the above circumstances. An object of the present invention is to provide an electronic device having improved operability.

Means for Solving the Problems

In order to solve the above problem, an electronic device according to a first aspect of the present invention includes a first display unit which displays information about an active application, which is being executed, a touch sensor which is overlapped on the first display unit and detects a touch thereto, and a control unit, wherein in a state where information about the active application is being displayed on the first display unit, the control unit performs processing on the active application when a touch to the touch sensor is determined as a first touch, and switches the active application into another application when the touch to the touch sensor is determined as a second touch which has a wider region than the first touch.

When a single touch is detected by the touch sensor, the control unit may determine the touch as the first touch, and when a plurality of touches are detected by the touch sensor, the control unit may determine the touches as the second touch.

The control unit may determine whether the touch is the first touch or the second touch by a width of an outer edge region including all detected touch region to the touch sensor.

When the touch is the second touch, the control unit may execute, in response to detecting sliding of the touch, the other application different from the application being executed, as the active application.

The control unit may display, on the first display unit, the information about the active application which is the application being executed, and information about the other application to be arranged in a predetermined direction.

The information about the active application may be displayed to be larger than the information about the other application.

The other application may be an application whose information is displayed in an area adjacent to the display area in which the information about the active application is displayed.

The other application may be an application that corresponds to information displayed at a base point of the touch.

The electronic device may further include a second display unit arranged on a face different from the first display unit, and the control unit may display at least the information about the active application on the first display unit and display at least the information about the other application on the second display unit.

The control unit may display information about a part of the other application on the first display unit.

Further, an electronic device according to a second aspect of the present invention includes a first display unit, a second display unit which is arranged on a face different from the first display unit, and a display control unit which displays at least information about an active application, which is being executed, on the first display unit, and displays at least information about a plurality of other applications different from the application being executed, to be arranged on the second display unit. The display control unit displays the information about the plurality of other applications in different modes, respectively.

The display control unit may display the information about the active application on the second display unit.

The display control unit may vary respective display areas of the information about the other applications according to the number of the other applications.

The information about the active application and the information about the other applications may be arranged in a predetermined direction on the second display unit, and the display control unit may display the information about the active application to be larger than the information about the other applications.

The electronic device may further include an operation unit, and the display control unit may display, as the information about the other applications, information about applications that are selected from applications executable in the electronic device based on an operation of the operation unit.

The electronic device may further include a using frequency detection unit which detects using frequencies of respective applications executable in the electronic device, and the display control unit may display, as the other applications, applications having higher using frequencies on the second display unit, based on the using frequencies detected by the using frequency detection unit.

The electronic device may further include an operation unit, and the display control unit may collectively change the display modes of the respective information displayed on the second display unit based on an operation of the operation unit.

When incoming call or data is received from an outside, the display control unit may display the reception on the second display unit.

According to a third aspect of the present invention, there is provided an information processing method including displaying information about an active application, which is being executed, on a first display unit, and in a state where information about the active application is being displayed on the first display unit, performing processing on the active application when a touch to a touch sensor which is overlapped on the first display unit and detects a touch thereto is determined as a first touch; and executing, as the active application, another application different from the application being executed when the touch to the touch sensor is determined as a second touch which has a wider region than the first touch.

According to a fourth aspect of the present invention, there is provided an information display method including displaying at least information about an active application, which is being executed, on a first display unit, and displaying at least information about a plurality of other applications different from the application being executed, to be arranged on a second display unit, wherein the information about the plurality of other applications is displayed in different modes, respectively.

Effects of the Invention

According to the present invention, it is possible to provide an electronic device which has improved operability.

BRIEF DESCRIPTION OF THE DRAWINGS

FIGS. 9(a) and 9(b) illustrate a switching of an active application of the cellular phone according to the second embodiment.

FIGS. 16(a) and 16(b) illustrate displays of a first display unit and a second display unit of the cellular phone according to the fourth embodiment when an active application is selected.

DETAILED DESCRIPTION OF EMBODIMENTS

Figure 1:
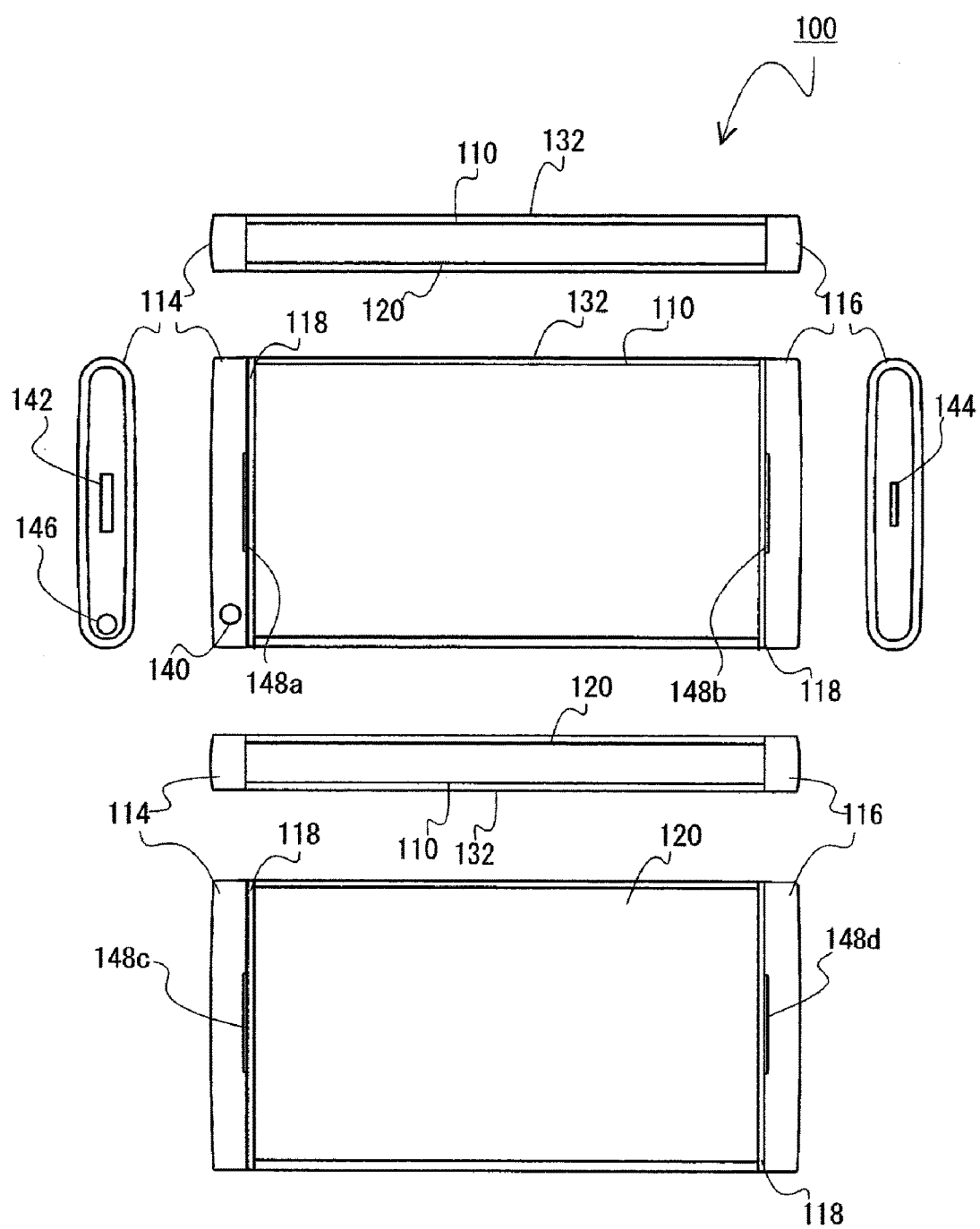
FIG. 1 is six views showing an outer appearance of a cellular phone according to a first embodiment.

Hereinafter, embodiments of the present invention will be specifically described with reference to the drawings. The sizes, materials and specific numerical values shown in the embodiments are just exemplary so as to easily understand the invention and the present invention is not limited thereto unless mentioned otherwise. In the specification and drawings, the constitutional elements having the substantially same function and configuration are indicated with the same reference numerals and the overlapped description thereof is omitted. In addition, the constitutional elements that are not directly related to the present invention are not shown.

First Embodiment

A cellular phone 100 which is the electronic device according to a first embodiment of the present invention is described. In the first embodiment, an active application 160 means an application being currently executed and to which an operation is input when operating the electronic device. In addition, even when an application is not actually activated yet, i.e., in a state where an icon (command) or shortcut menu of activating the application can receive an operation input, the application is refereed to as the active application. In contrast, an inactive application 170 (other application) in the first embodiment means an application in a state where an operation is not to be input and includes an application that is not being executed and an application that is being executed on a background.

(Outer Configuration)

FIG. 1 is six views showing an outer appearance of the cellular phone 100 according to the first embodiment. The cellular phone 100 shown in FIG. 1 has a first display unit 110 that is arranged on one face of a housing and a second display unit 120 that is arranged on an opposite face to the first display unit 110 and has the substantially same display area as the first display unit 110. A transparent touch sensor 132 is overlapped on the first display unit 110 (the touch sensor is not overlapped on the second display unit 120 in the first embodiment).

The first display unit 110 and the second display unit 120 are bent at long sides and connected, respectively, so that they surround an outer circumference of the housing. An outer appearance of the housing (the touch sensor 132 configures the outer appearance on the front face) has a section of a substantially oval shape in the bent directions of the first display unit 110 and the second display unit 120. In other words, the first display unit 110 and the second display unit 120 form a generally flat container shape. Both ends of the container are provided with end members 114, 116.

In the meantime, the substantially oval shape includes not only a true oval shape (including a circle) but also a shape other than the true oval shape. For example, the substantially oval shape may be an elongated circle shape having a flat main surface and a semi-circular end whose end is generally circular, a shape whose central portion protrudes from the main surface of the elongated circle shape and a shape that is obtained by flattening the oval shape in a short or long axis.

The end members 114, 116 are connected to the first display unit 110 and the second display unit 120 with light transmission parts 118 being interposed therebetween, respectively. The light transmission part 118 allows light, which is emitted from a light emitting unit 152 (refer to FIG. 3) configured by LEDs and the like and provided inside the housing, to penetrate therethrough and guides the same to the outside. In the meantime, the end members 114, 116 may be connected to the first display unit 110 and the second display unit 120 without the light transmission parts 118.

A face of the end member 114 connected to the first display unit 110 is provided with a camera 140. In addition, an end face of the end member 114, which corresponds to one side face of the housing, is provided with a voice output unit 142 and a power button 146. An end face of the end member 116, which is arranged to be opposite to the end face of the end member 114, is provided with a voice input unit 144. That is, by disposing the voice output unit 142 and the voice output unit 144 on the end faces of the end members 114, 116 (side surfaces of the housing), a user can hold the housing, irrespective of the front face or back face of the housing, when making a call.

In addition, sound output ports 148a, 148b that output sound, which is generated from a stereo speaker 150 (refer to FIG. 2) provided inside the housing, from the inside of the housing to the outside of the housing are respectively formed at substantially central portions of the housing in a width direction existing between the first display unit 110 and the end member 114 and the end member 116, respectively.

Similarly, sound output ports 148a, 148b that output sound, which is generated from the stereo speaker 150 provided inside the housing, from the inside of the housing to the outside of the housing are respectively formed at substantially central portions of the housing in a width direction existing between the second display unit 120 and the end member 114 and the end member 116, respectively.

In other words, the sound output ports 148a, 148b and the sound output ports 148c, 148d are respectively formed adjacent to the light transmission parts 118 of the end member 114 and the end member 116 at the substantially central portions of the housing in a width direction.

Sound guiding paths (not shown) for guiding the sound generated from the stereo speaker 150 are connected to the sound output ports 148a, 148b, 148c, 148d, so that it is possible to equally output the sounds from the respective ports.

(Functional Configuration)

Figure 2:
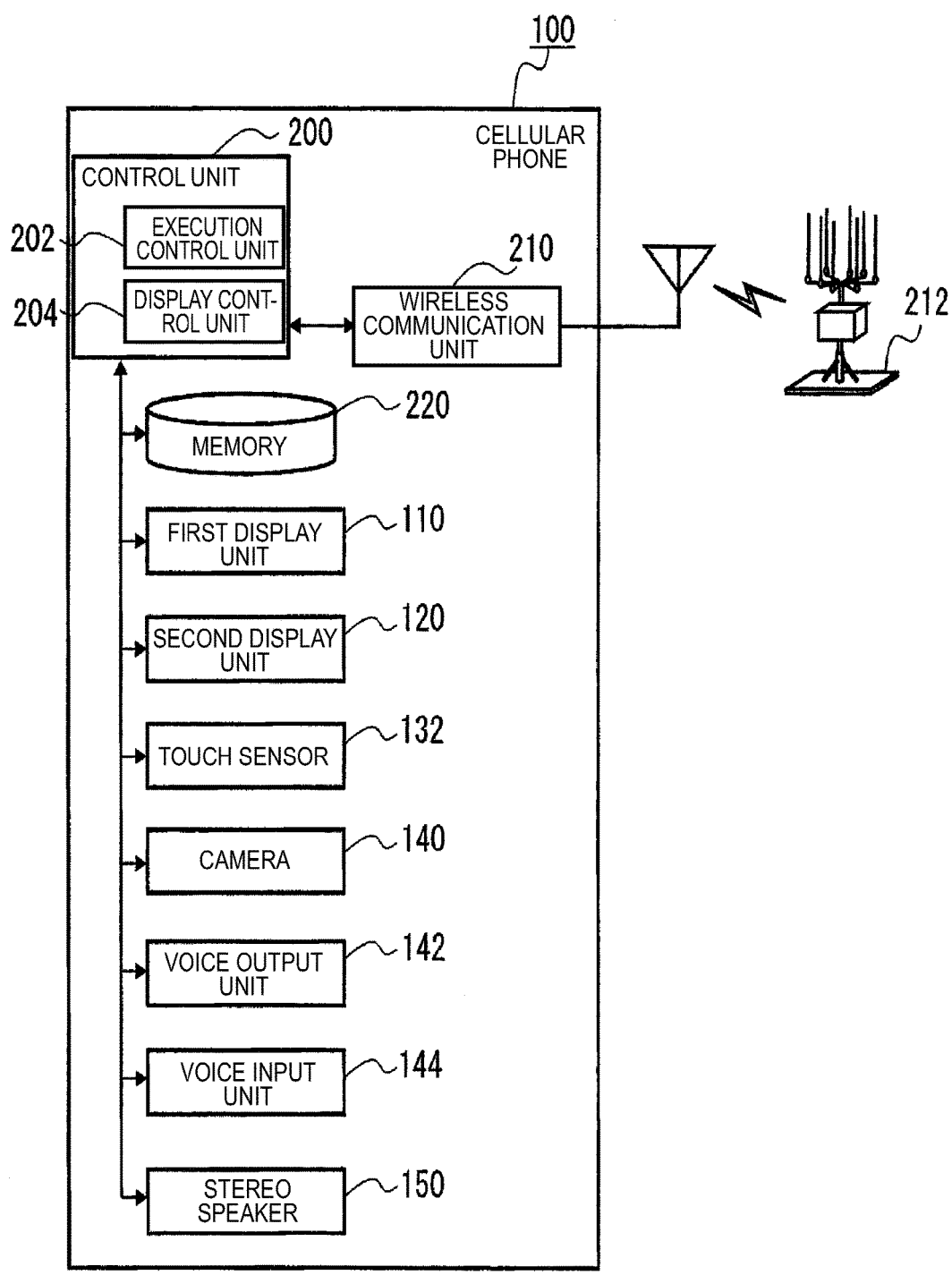
FIG. 2 is a block diagram showing schematic functions of the cellular phone according to the first embodiment.

FIG. 2 is a block diagram showing schematic functions of the cellular phone 100 according to the first embodiment, and FIG. 3 illustrates an assessment method of determining whether a touch to the touch sensor 132 is in a narrow region or wide region. As shown in FIG. 2, the cellular phone 100 has the first display unit 110, the second display unit 120, the touch sensor 132, the camera 140, the voice output unit 142, the voice input unit 144, the stereo speaker 150, a control unit 200, a wireless communication unit 210 and a storage unit (memory) 220.

The control unit 200 manages and controls the whole cellular phone 100 by a semiconductor integrated circuit including a central processing unit (CPU). Specifically, for example, the control unit 200 executes applications stored in the storage unit 220, which realize a calling function, a character input function, a music reproduction function, a TV watching function and the like, and applications such as Web browser, schedule management and the like provided from an application relay server (not shown) via a communication network. The control unit 200 includes an execution control unit 202 and a display control unit 204.

When a touch to the touch sensor 132 is determined as a first touch, i.e., when an operation on the touch sensor 132 is input in a narrow region, the execution control unit 202 transmits the operation to the active application 160 (input operation on a current display screen). When a touch to the touch sensor 132 is determined as a second touch that has a wider region than the first touch, i.e., when an operation on the touch sensor 132 is input in a wide region, the execution control unit executes, as an application different from the active application 160, the inactive application 170 (another application different from the application that is being executed as the active application 160) arranged on a list screen (which will be described later).

Figure 3A:
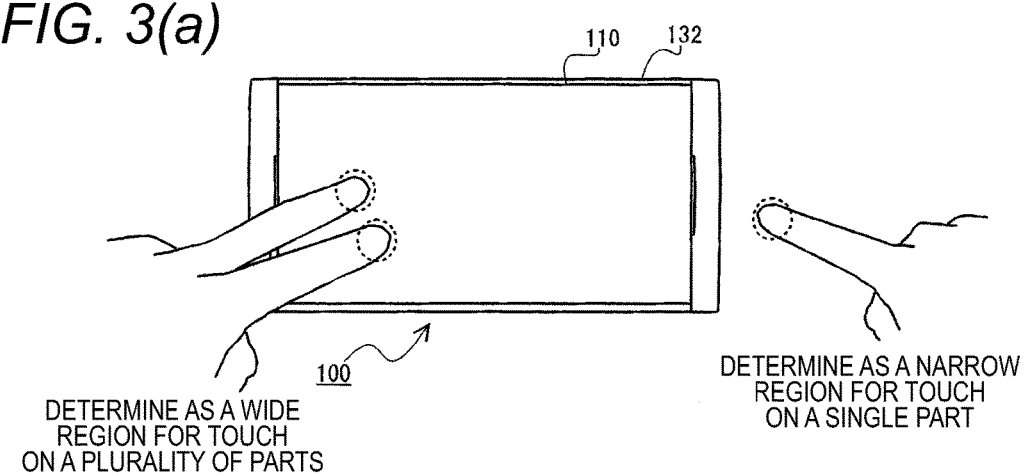
FIGS. 3(a) to 3(c) illustrate an assessment method of determining whether a touch to a touch sensor is a narrow region or wide region.

In the meantime, the narrow region and the wide region are not limited to specific regions and may be any regions inasmuch as relative relationship can be determined on the basis of a predetermined assessment method. Specifically, it may be possible to determine whether the touch is made in the narrow region or wide region, based on whether a single touch or a plurality of touches is detected by the touch sensor 132, i.e., whether the touch sensor 132 is touched at one location or at a plurality of locations, as shown in FIG. 3(a).

Figure 3B:
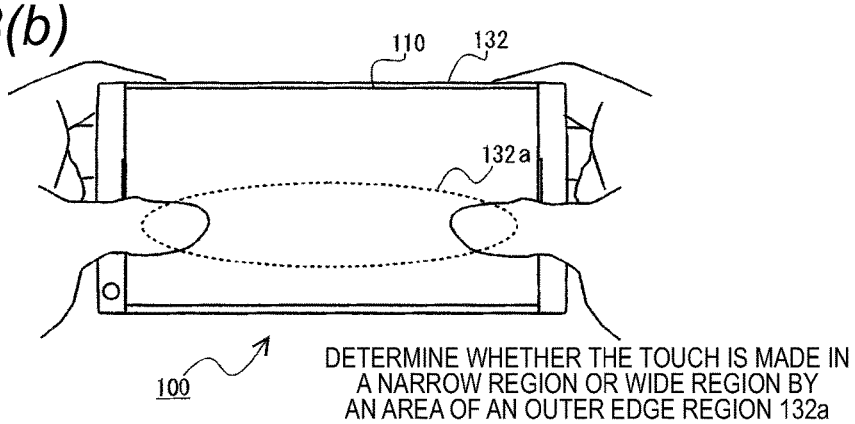

In addition, as shown in FIG. 3(b), it may be possible to determine whether the touch is made in the narrow region or wide region by a width of an outer edge region 132a including all detected touch regions to the touch sensor 132. When performing the determination by the outer edge region 132a, it is possible to determine whether the touch is made in the narrow region or wide region, irrespective of whether the touch is made to the touch sensor 132 between the touch regions.

Figure 3C:
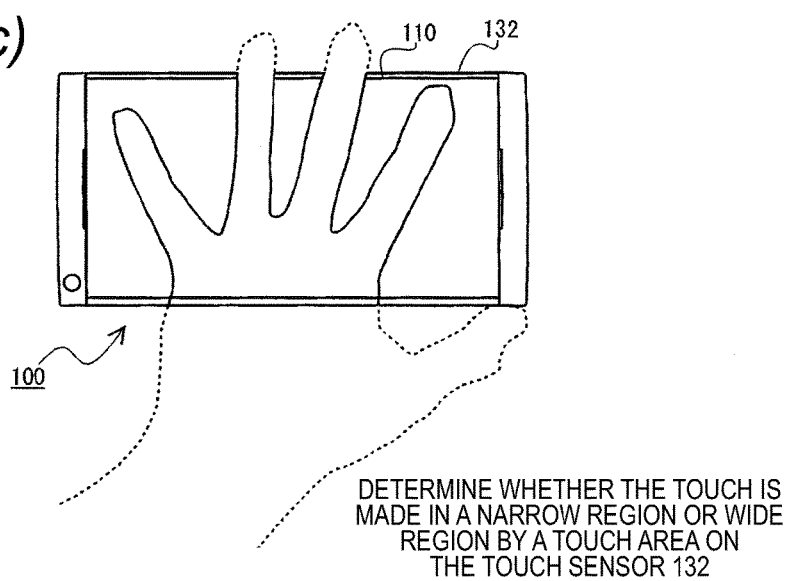

Further, as shown in FIG. 3(c), it may be possible to determine whether the touch is made in the narrow region or wide region by a touch area to the touch sensor 132. In this case, a sum of the touch areas to the touch sensor 132 is used as a determination object. When the sum of the touch areas is greater than a predetermined area, it is determined that the touch is made in the wide region. When the sum is smaller than the predetermined area, it is determined that the touch is made in the narrow region. The predetermined area may be determined using an area of finger sizes, which is statistically obtained. Alternatively, a user may set the predetermined area by calibration before using the terminal.

The display control unit 204 controls screens that are displayed on the first display unit 110 and the second display unit 120. The operations of the execution control unit 202 and the display control unit 204 will be specifically described later.

The storage unit 220 is configured by a ROM, a RAM, an EEPROM, a non-volatile RAM, a flash storage unit, a HDD and the like and stores the programs, which are processed by the control unit 200 (display control unit 204), the other data and the like.

The first display unit 110 and the second display unit 120 may be configured by a Thin Film Transistor (TFT) liquid crystal display having transistors formed on a resin substrate, an organic electro luminescence (EL) display, a cholesteric liquid crystal display and the like, for example. In the first embodiment, the TFT liquid crystal display is used as the first display unit 110 and the second display unit 120. The first display unit 110 and the second display unit 120 are controlled by the display control unit 204 and display the screens.

The first display unit 110 configures an input interface by a combination with the touch sensor 132. The input interface realizes functions corresponding to the related operation keys, such as keyboard, cross keys, joystick and the like. In the meantime, the touch sensor 132 may be also overlapped on the second display unit 120 to configure the input interface.

The touch sensor 132 is made of transparent or semi-transparent material and is overlapped to the first display unit 110 visibly. In the first embodiment, a so-called touch screen type that is attached on the surface of the first display unit 110 is adopted as the touch sensor 132. However, a pressure detection type that is attached on the back side of the first display unit 110 may be also used. The touch detection method of the touch screen type includes two methods of a pressure detection type of detecting a change in pressures and an electrostatic capacitance type of detecting an electric signal by static electricity.

The voice output unit 142 includes a speaker and converts a voice signal of a calling party received by the cellular phone 100 into sound and outputs the same. The stereo speaker 150 outputs an incoming sound, an operation sound of the input interface by the first display unit 110 and the touch sensor 132, a TV sound, music, an alarm sound and the like.

The voice input unit 144 includes a voice recognition unit such as microphone and converts user's voice, which is input when making a call, into an electric signal that can be processed in the cellular phone 100.

The wireless communication unit 210 performs wireless communication with a base station 212 (refer to FIG. 2) in a cellular phone network. The wireless communication includes time division multiplex in which a plurality of time slots having frames time-divided in the base station 212 is allotted to channels of the cellular phone 100, respectively, to perform communication, and the like.

(Operation Explanation)

Figure 4A:
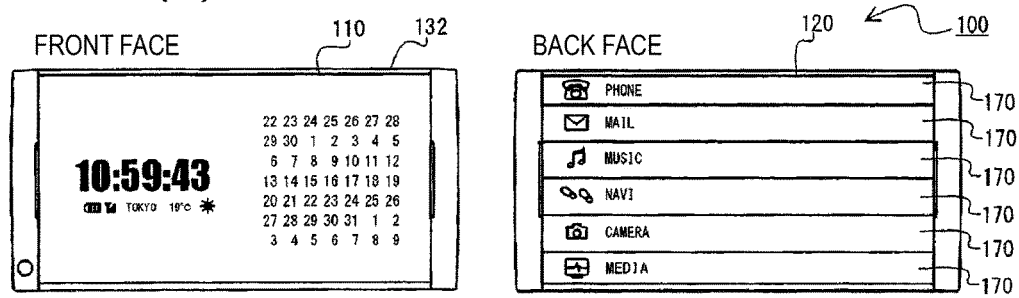
FIGS. 4(a) to 4(c) illustrate displays on a first display unit and a second display unit of the cellular phone according to the first embodiment.
Figure 4B:
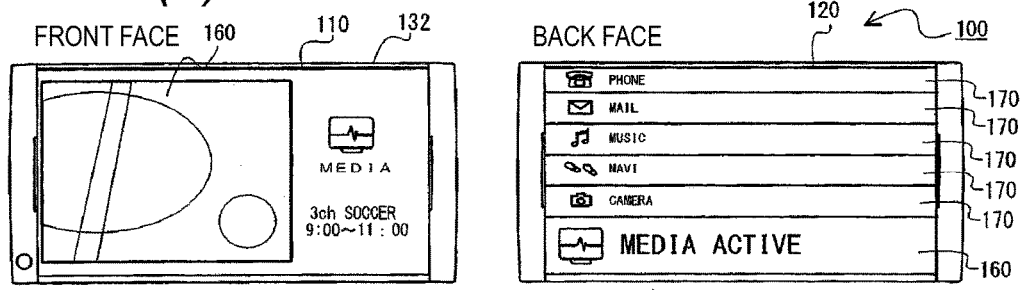
Figure 4C:
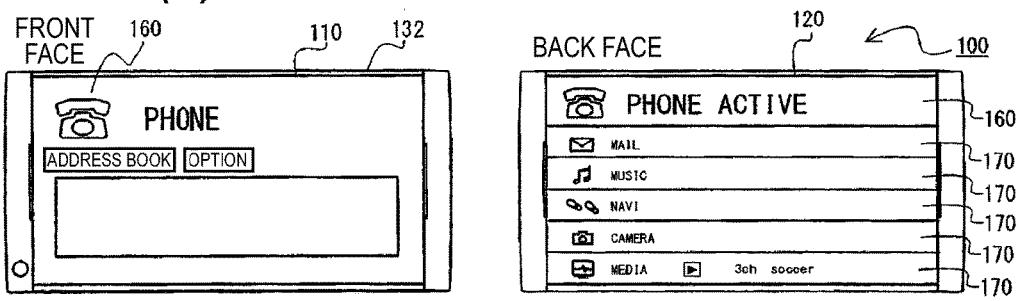
Figures 5A, 5B:
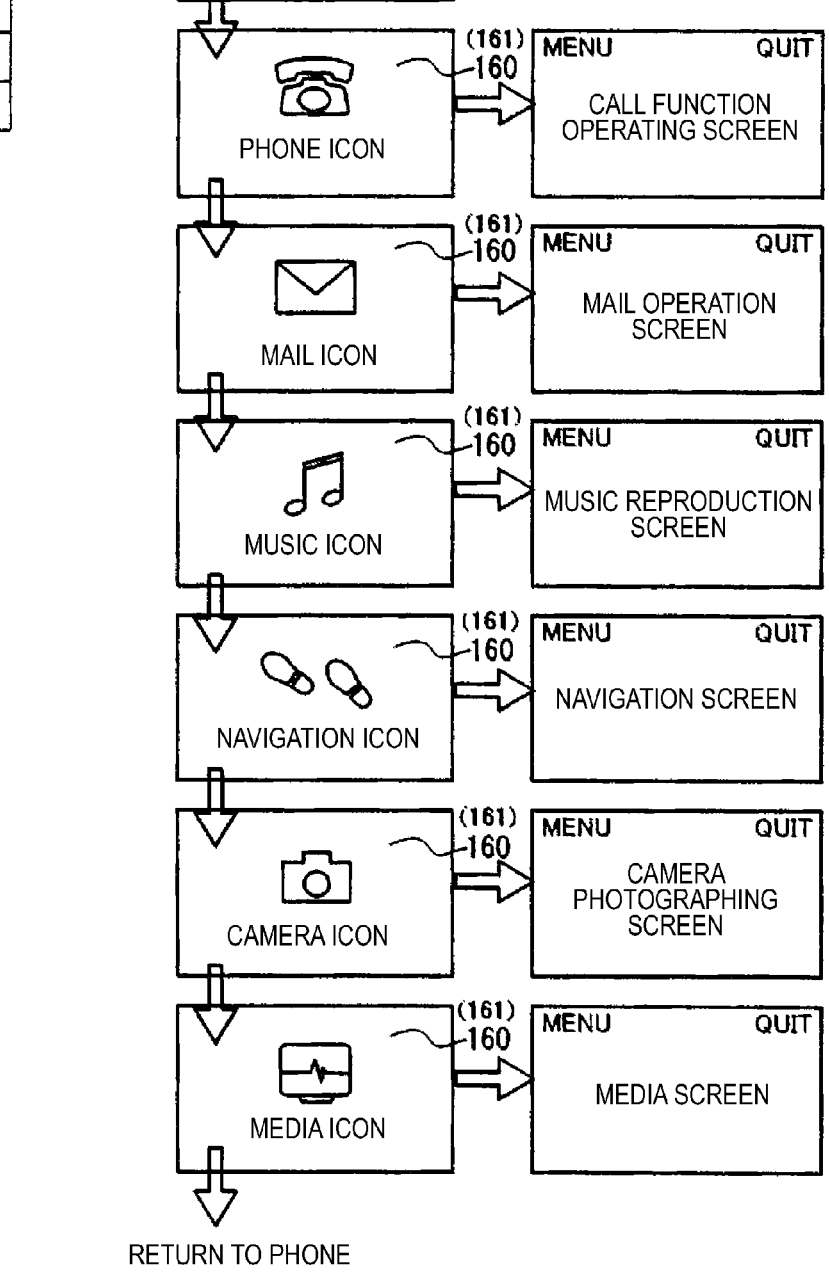
FIGS. 5(a) and 5(b) illustrate a switching of an active application of the cellular phone according to the first embodiment.

FIG. 4 illustrates displays on the first display unit 110 and the second display unit 120 of the cellular phone 100 according to the first embodiment. In particular, FIG. 4(*a*) shows the cellular phone 100 when displaying a standby screen, FIG. 4(*b*) shows the cellular phone 100 when displaying a media application as the active application 160, and FIG. 4(*c*) shows the cellular phone 100 when displaying a calling application as the active application 160. In addition, FIG. 5 illustrates a switching of the active application 160 of the cellular phone 100 according to the first embodiment. In particular, FIG. 5(*a*) shows a list screen and FIG. 5(*b*) shows a screen of the active application 160.

As shown in FIG. 4, in the first embodiment, the display control unit 204 displays information about the active application 160, i.e., a screen of the active application 160 on the first display unit 110 and a list screen on the second display unit 120. The list screen is a screen in which applications to be switched are listed. In the list screen, the information about the respective applications is arranged in a predetermined direction. The information about the active application 160 is displayed to be larger than the information about the inactive applications 170. For example, in the list screen, the applications are displayed in a band shape, respectively. As shown in FIGS. 4(*b*) and 4(*c*), the band indicating the active application 160 is displayed to be wider than the bands indicating the inactive applications 170. Thereby, it is possible to recognize what application the active application 160 is, even from the back side. In the meantime, in the first embodiment, the bands are arranged in a direction (switching direction, i.e., scroll direction) perpendicular to the end members 114, 116. However, the bands may be arranged in a parallel direction.

Specifically, as shown in FIG. 4(*a*), when the active application is not selected (when the cellular phone 100 starts up, and the like), a standby screen may be displayed on the first display unit 110 that is at the front side of the cellular phone 100. The standby screen is released by touching a wide region.

As shown in FIG. 5, when a touch in a wide region is made on the touch sensor 132 in the standby screen, Phone (calling) is displayed as the active application 160. When repeating the touch in the wide region, the active application 160 is switched in order of Mail, Music, Navigation, Camera, Media and Phone. The sequence is displayed as the list screen on the second display unit 120.

In the meantime, in the screen of the active application 160 that is newly displayed on the first display unit 110, if the corresponding application has not been activated (executed) yet, an icon (command) for activating (executing) the application is displayed. This is activated (is executed) by a touch (tap) in the narrow region. In addition, when the application has been activated (executed) already, a screen corresponding to the state is displayed. An operation to the active application is also input by the touch (tap) in the narrow region.

Here, as shown in FIG. 4(*b*), it is assumed that the media application is selected as the active application 160. In this case, a screen of the media application is displayed on the first display unit 110 and the band indicating the media application is also displayed with being enlarged (for example, a width is widened) on the list screen of the second display unit 120.

In addition, as shown in FIG. 4(*c*), it is assumed that the touch in a wide region is made on the touch sensor and the calling application is thus selected as the active application 160. Then, a screen of the calling application is displayed on the first display unit 110, and the band, which is displayed with being widened on the list screen of the second display unit 120, indicates the calling application. Accordingly, it is possible to recognize what application the current active application 160 is, even from the back side (rear side) of the cellular phone 100.

At this time, when the calling application is being executed already, a indication showing that the application is being executed (ACTIVE) is displayed for the application displayed on the list screen. Accordingly, it is possible to easily recognize an operating status of an even application that is not currently active.

In the meantime, the inactive applications 170 that can be listed on the list screen are preferably specific applications that are selected by a user. In other words, all applications that can be executed by the cellular phone 100 are not displayed on the list screen. Therefore, it is possible to immediately switch the applications frequently used, thereby improving the operability. The applications, which are not selected as the specific applications, may be selected by a menu command proceeding to a lower hierarchy, which is provided on the standby screen.

In the meantime, when an application that does not exist on the list screen is selected as the active application, it may be interrupt-displayed on the list screen.

Figure 6A:
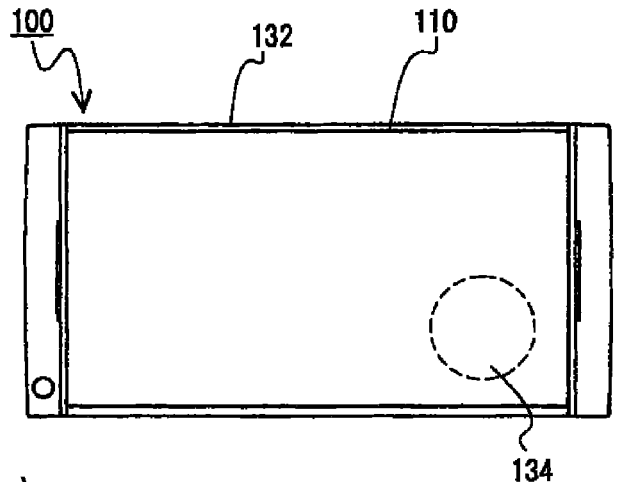
FIGS. 6(a) and 6(b) show an example of performing a return determination from a stop state by using a touch sensor.
Figure 6B:
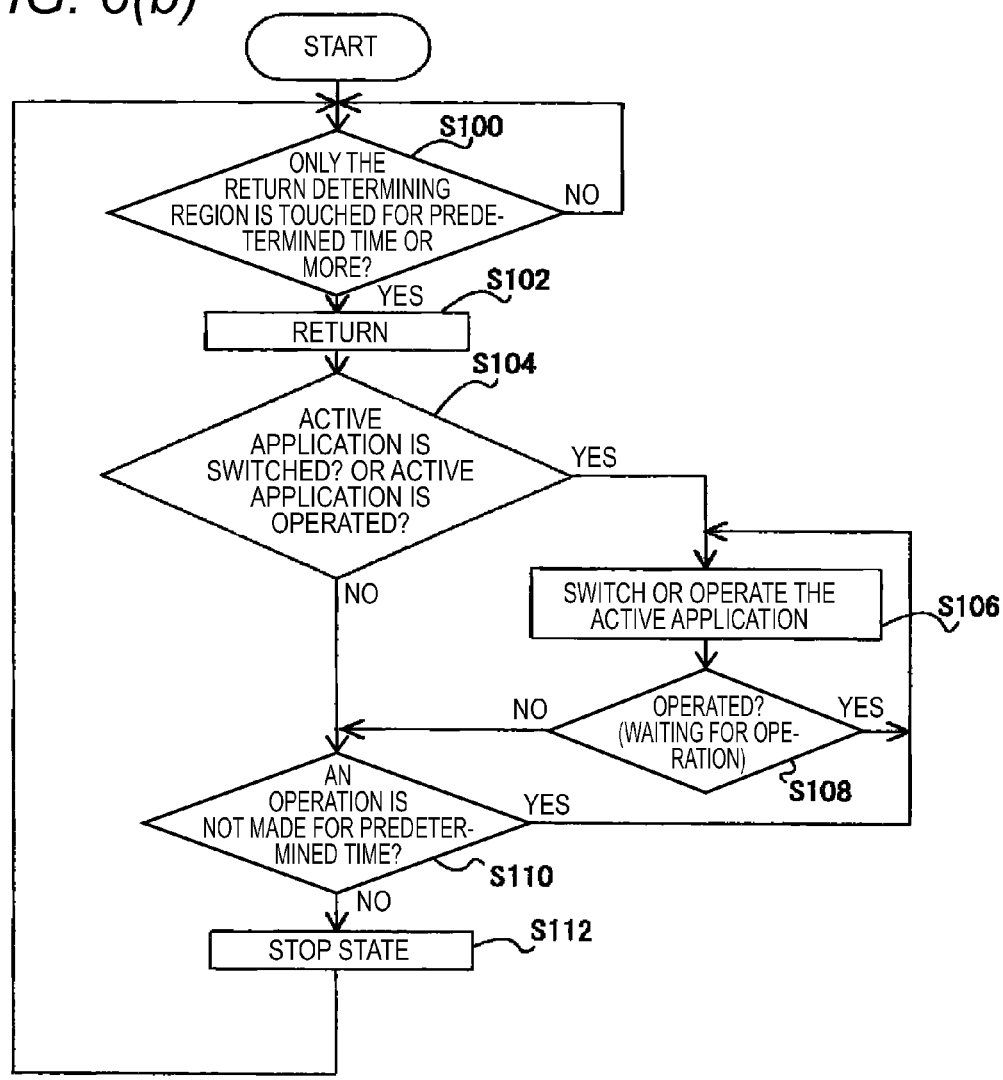

FIG. 6 shows an example of performing a return determination from a stop state by using the touch sensor 132, in which FIG. 6(a) shows an example of a return determination region and FIG. 6(b) shows a flowchart of the stop state and the return.

In order to suppress power consumption and to thus extend operating time, when an operation is not made for predetermined time or more, the control unit 200 shifts to a stop state to stop application operations, except for some main functions such as calling function. When the operation of the cellular phone 100 starts, the control unit 200 returns from the stop state. The cellular phone 100 performs the various operations by using the touch sensor 132. However, since the touch sensor 132 is a device that detects a touch, if the return operation is executed just by detecting a touch with the touch sensor 132, the cellular phone 200 rarely shifts into the stop state when it is put in a bag or pocket, so that the power is rapidly consumed.

Accordingly, in the first embodiment, a specific region is set so as to determine the return from the stop state. Specifically, as shown in FIG. 6(a), for example, a return determining region 134 is set at a lower right part of the touch sensor 132. The return is determined based on whether a touch is made only on the return determining region 134 for predetermined time or more.

The specific example of the stop state and return made by the control unit 200 is described with reference to a flowchart of FIG. 6(b). When it is determined that the cellular phone is at the stop state, the control unit 200 determines whether only the return determining region 134 is touched for predetermined time or more (S100). When the condition is not satisfied (S100: NO), the control unit 200 continues the determination in S100. When the condition of S100 is satisfied (S100: YES), the control unit returns (S102). At this time, the control unit 200 displays a standby screen on the first display unit 110 and a list screen on the second display unit 120. In the meantime, the control unit 200 may determine the return from the stop state by detecting whether the power button 146 is pushed, for example.

The control unit 200 determines whether a switching operation of the active application 160 is made on the standby screen or whether an operation to the switched active application 160 is made (S104). When any operation is made (S104: YES), the control unit 200 switches the active application 160 or perform processing on the active application 160 (S106), and when the process is completed, the control unit waits for a next operation (S108). When any operation is not made after the return (S104: NO) or at an operation waiting state (S108), the control unit 200 determines whether an operation is not made for predetermined time (S110). When it is determined that an operation is made in S110 (S110: YES), the control unit 200 performs a corresponding process (S106), and when it is determined that an operation is not made (S110: NO), the cellular phone shifts into the stop state (S112). After the stop state, it is determined again whether only the return determining region 134 is touched for predetermined time or more (S100).

By the above configuration, it is possible to prevent a false operation with high precision even with the cellular phone 100 having the touch sensor 132 only. In the meantime, the control unit 200 may display a still image or moving image, which indicates a range of the return determining region 134, at the stop state.

As described above, in the cellular phone 100 according to the first embodiment, it is possible to considerably increase the amount of information on the display unit by providing both faces of the housing with the first display unit 110 and the second display unit 120 having the substantially same display area. The screen of the active application 160 is displayed on the first display unit 110 and the list screen is displayed on the second display unit 120. In addition, when the touch is made in the narrow region of the touch sensor 132, it is considered as the input operation on the current display screen, and when the touch is made in the wide region, it is considered as the switching operation of the active application 160. As a result, the operability is improved.

In the first embodiment, the power button 146 is provided on the end face of the end member 114. However, the end members 114, 116 themselves may be configured as a power button having a switch mechanism. By making the power button larger, the operability is improved, and the power button is not visible well seemingly, so that an esthetic sense is improved. Also, it is possible to secure an area for arranging a connector and the like.

Furthermore, the end faces of the end members 114, 116 may be provided with keys for inputting characters. For example, virtual keys may be displayed on the touch sensor 132 for consonants, vowel selecting keys may be provided to the end member 114 and an enter key may be provided to the end member 116, so that it is possible to enlarge an area of an individual virtual key and to thus perform the input operation at high speed.

Second Embodiment (Outer Configuration)

A cellular phone 300 which is the electronic device according to a second embodiment of the present invention is described. The cellular phone 300 has the same outer configuration as the cellular phone 100 according to the first embodiment.

(Functional Configuration)

Figure 7:
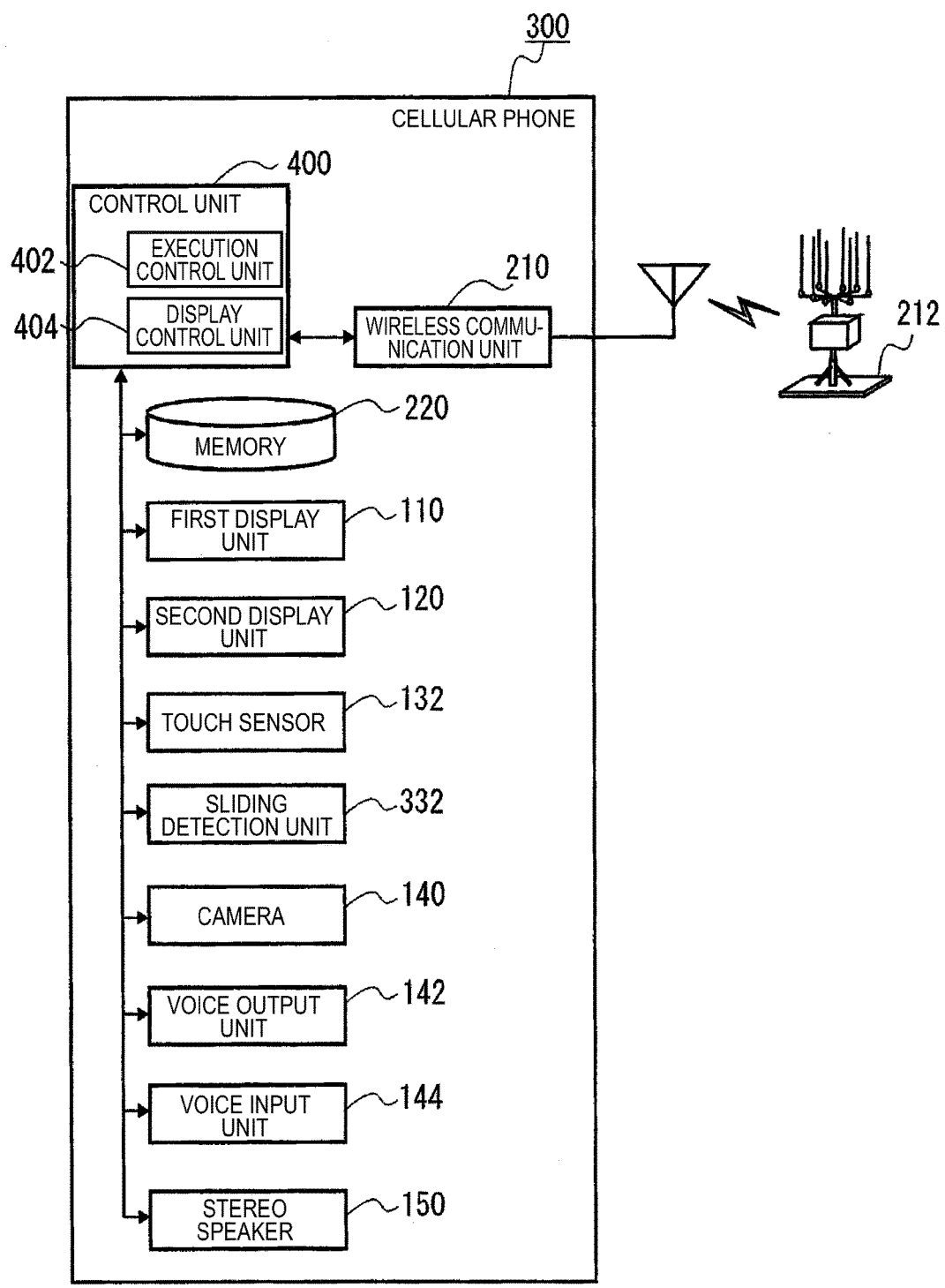
FIG. 7 is a block diagram showing schematic functions of a cellular phone according to a second embodiment.

FIG. 7 is a block diagram showing schematic functions of the cellular phone 300 according to the second embodiment. As shown in FIG. 7, the cellular phone 300 has the first display unit 110, the second display unit 120, the touch sensor 132, the camera 140, the voice output unit 142, the voice input unit 144, the stereo speaker 150, a control unit 400, the wireless communication unit 210, the storage unit (memory) 220 and a sliding detection unit 332.

The control unit 400 manages and controls the whole cellular phone 300 by a semiconductor integrated circuit including a central processing unit (CPU). Specifically, for example, the control unit executes applications stored in the storage unit 220, which realize a calling function, a character input function, a music reproduction function, a TV watching functions and the like, and applications such as Web browser, schedule management and the like provided from an application relay server (not shown) via a communication network. The control unit 400 includes an execution control unit 402 and a display control unit 404.

When an operation on the touch sensor 132 is input in a narrow region, the execution control unit 402 transmits the operation to the active application 160 (input operation on a current display screen). When an operation on the touch sensor 132 is input in a wide region, the execution control unit executes one of the inactive applications 170 which are different from the active application 160 and which are listed on a list screen (which will be described later), in response to the detection of the sliding detection unit 332. Accordingly, it is possible to reduce the switching of the active application 160 due to a false operation.

The display control unit 404 controls screens that are displayed on the first display unit 110 and the second display unit 120. In the second embodiment, the display control unit 404 displays at least a screen of the active application 160 on the first display unit 110 and a list screen on the second display unit 120. Different from the cellular phone 100 according to the first embodiment, the band indicating the active application 160 is not displayed on the list screen but the bands indicating the inactive applications 170 are scrolled.

The sliding detection unit 332 detects sliding of the touch to the touch sensor 132 and transmits it to the execution control unit 402.

(Operation Explanation)

Figure 8A:
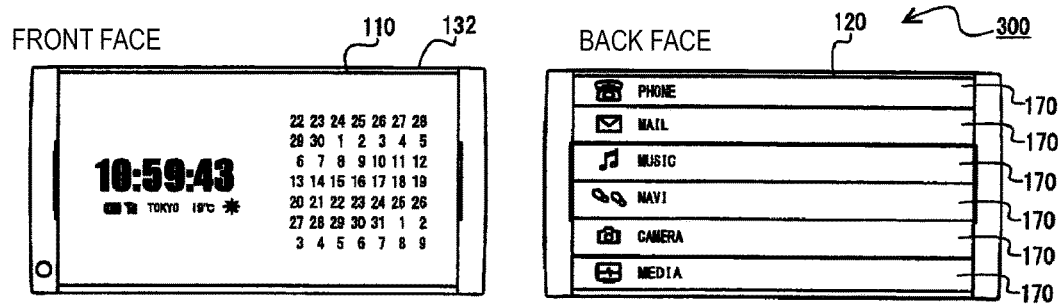
FIGS. 8(a) to 8(c) illustrate displays on a first display unit and a second display unit of the cellular phone according to the second embodiment.
Figure 8B:
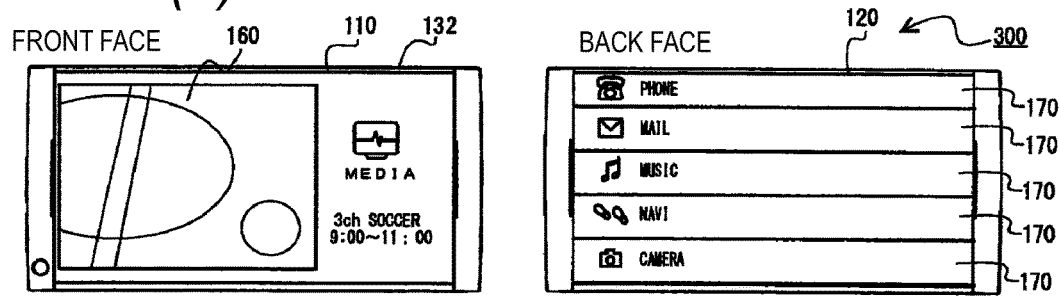
Figure 8C:
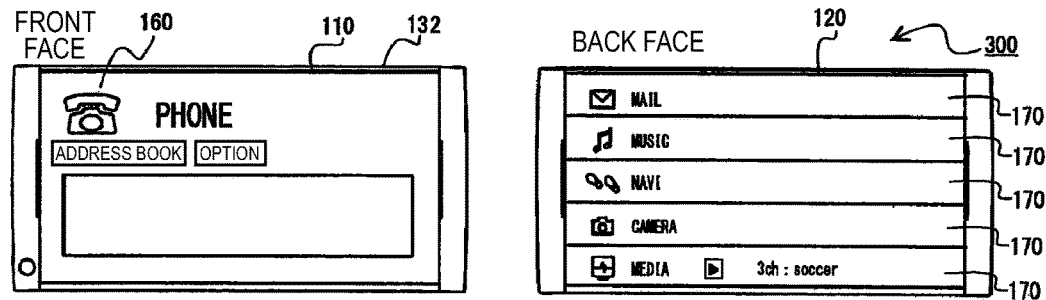

FIG. 8 illustrates displays on the first display unit 110 and the second display unit 120 of the cellular phone 300 according to the second embodiment. In particular, FIG. 8(a) shows the cellular phone 300 when displaying a standby screen, FIG. 8(b) shows the cellular phone 300 when displaying a media application as the active application 160, and FIG. 8(c) shows the cellular phone 300 when displaying a calling application as the active application 160. FIG. 9 illustrates a switching of the active application 160 of the cellular phone 300 according to the second embodiment. In particular, FIG. 9(a) shows a list screen and FIG. 9(b) shows a screen of the active application 160.

As shown in FIG. 8(a), when the active application is not selected (when the cellular phone 300 starts up, and the like), a standby screen may be displayed on the first display unit 110 that is at the front side of the cellular phone 300. The standby screen is released by the sliding of the touch in a wide region.

As shown in FIG. 9, in the standby screen, when sliding of the touch in the wide region is made to the touch sensor 132, the active application 160 and the inactive applications 170 listed on the list screen are scrolled in the sliding direction. For example, when the sliding is made in a scroll direction 501, Phone (calling) is displayed as the active application 160 and the band of Phone is deleted from the list screen. When the sliding is repeated in the scroll direction, the active application 160 is switched in order of Mail, Music, Navigation, Camera, Media and Phone (in order of the scroll direction 501). As the active application is switched, the inactive applications 170 listed on the list screen are also scrolled. In other words, the execution control unit 402 executes the inactive application 170 (other application) corresponding to the band adjacent to the band indicating the active application 160, thereby switching it into the active application 160.

Specifically, when the active application 160 is scrolled in the scroll direction 501, it is switched into an application of the inactive applications 170 listed on the list screen, which is located at the end (upper end) of the scroll direction 501. As the application is newly displayed on the first display unit 110, the band indicating the corresponding application is deleted from the list screen of the second display unit 120 with being scrolled in the scroll direction 501. In addition, while the application (active application 160) displayed on the first display unit 110 is scrolled in the scroll direction 501, it is added to the opposite end (lower end) of the scroll direction 501 on the list screen of the second display unit 120. The above switching of the operation screens is performed continuously and smoothly. Accordingly, the operation is made so that the inactive application 170 listed on the list screen of the second display unit 120 at the back side is rotated and moved to the front side and is then displayed on the first display unit 110. Thus, it is possible to sequentially switch a plurality of applications, as if a container were rotated. In this embodiment, the scroll direction 501 has been exemplified. However, a scroll direction 502 corresponding to an opposite sliding direction is also applicable.

More specifically, as shown in FIG. 8(b), it is assumed that the media application is selected as the active application 160. Thus, the inactive applications on the list screen of the second display unit 120 are scrolled, so that Phone and Camera are arranged at both ends of the list screen.

In addition, as shown in FIG. 8(c), when the sliding is further made in the scroll direction 501 from the above state, the calling application is selected as the active application 160. In this case, Mail and Media are arranged at both ends of the list screen of the second display unit 120.

Like in the second embodiment, when the second display unit 120 that is arranged on the different face is additionally provided in addition to the first display unit 110, the display control unit 404 may display one of the inactive applications 170 on the first display unit 110 while displaying the active application 160 on the first display unit 110 and the inactive applications 170 on the second display unit 170. In other words, the display control unit may display a part (a part of the list screen) of the inactive applications 170, which can be displayed on the second display unit, on the first display unit 110.

Figure 10:
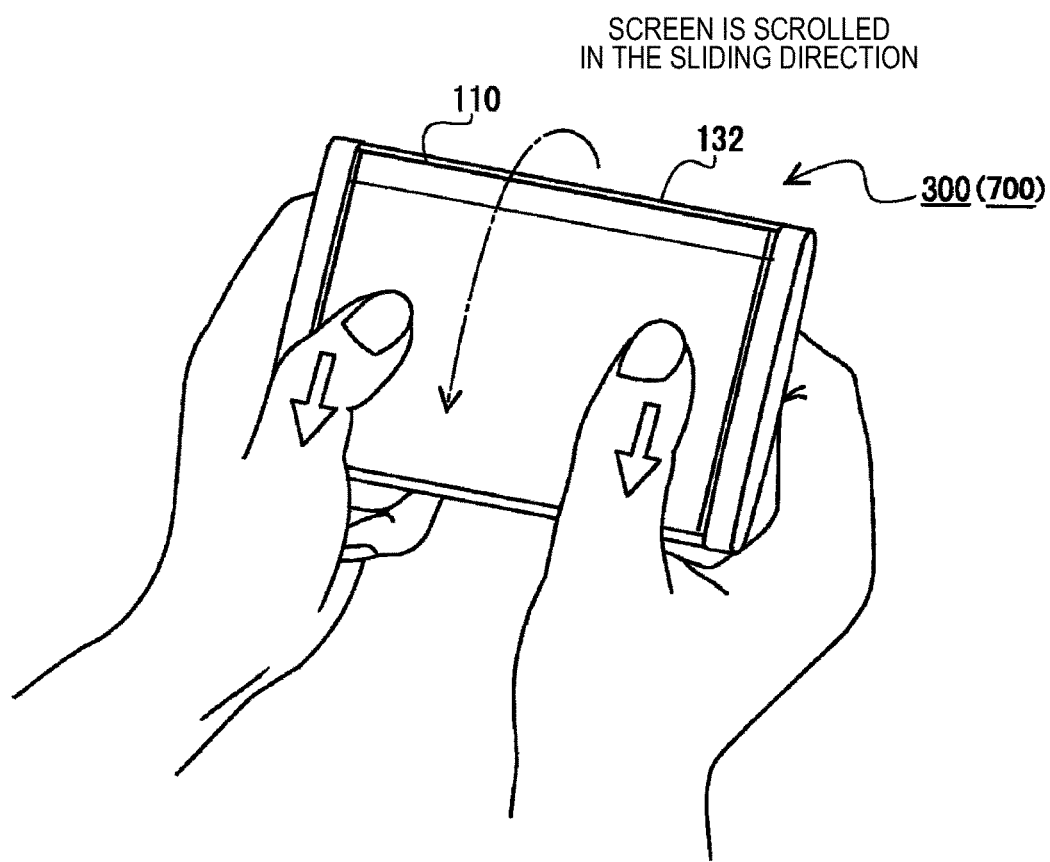
FIG. 10 illustrates a switching of an active application by sliding of touch in a wide region to a touch sensor.

FIG. 10 illustrates a switching of the active application 160 by sliding of the touch in the wider range to the touch sensor 132. As shown in FIG. 10, in the second embodiment, it is assumed that the active application 160 is switched by performing the sliding on the touch sensor 132 with both thumbs. According to this method, a user can easily hold the terminal to easily perform the operation. Furthermore, when it is set so that both fingers-touch is in the wide region and one finger-touch is in the narrow region, the switching can be performed more appropriately.

Figure 11A:
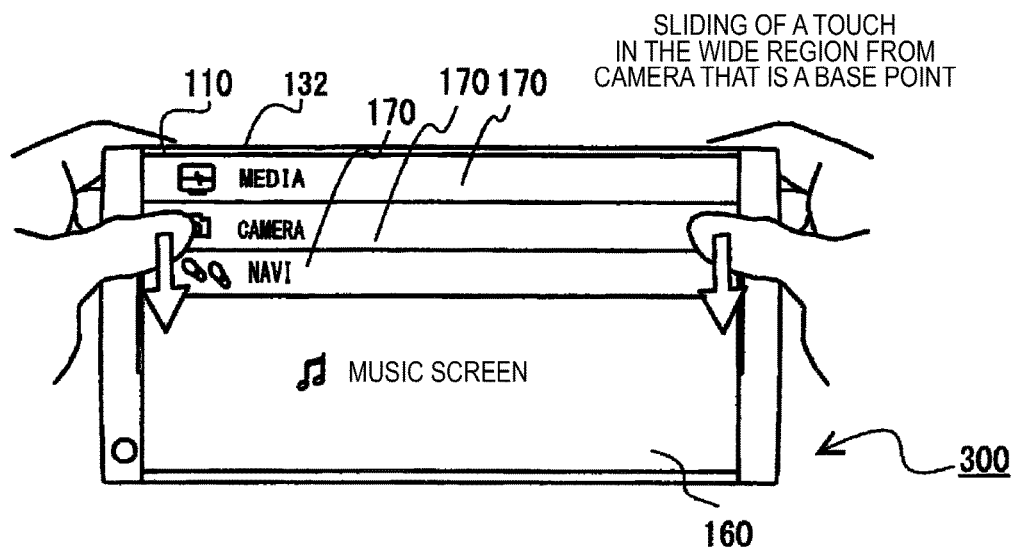
FIGS. 11(a) and 11(b) illustrate another switching method of an active application.
Figure 11B:
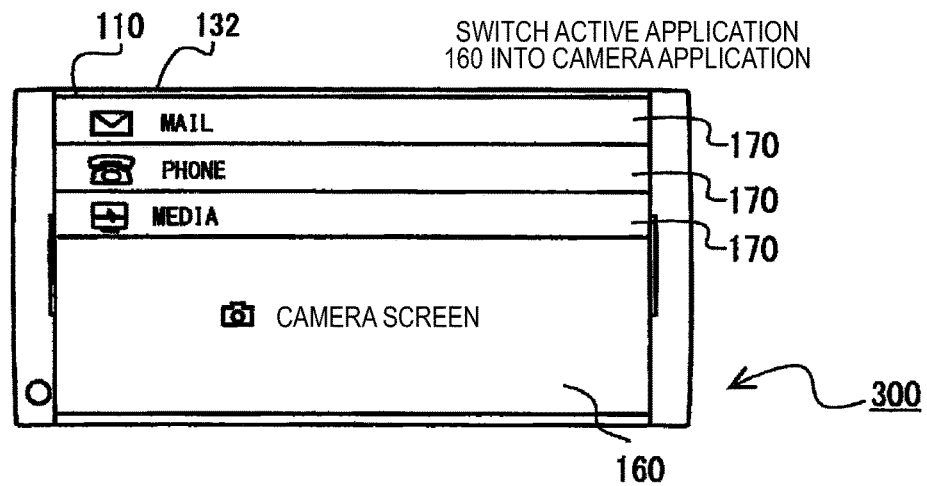

FIG. 11 illustrates another switching method of the active application 160. As shown in FIG. 11, the inactive applications 170 are displayed on the first display unit 110 and the switching may be made by sliding the inactive applications 170. That is, by sliding the touch in the wider region from the band indicating the desired application as a base point (refer to FIG. 11(a)), the execution control unit 402 can switch the inactive application 170 corresponding to the band displayed on the base point of the sliding, into the active application 160 (refer to FIG. 11(b)). Thereby, it is possible to simply perform the switching without repeating the sliding of the touch in the wide region until reaching the desired application. In the meantime, the inactive application that is displayed on the first display unit 110 may be a part of the inactive applications 170 that can be listed on the list screen, or may be an application that is separately selected.

Third Embodiment

Figure 12:
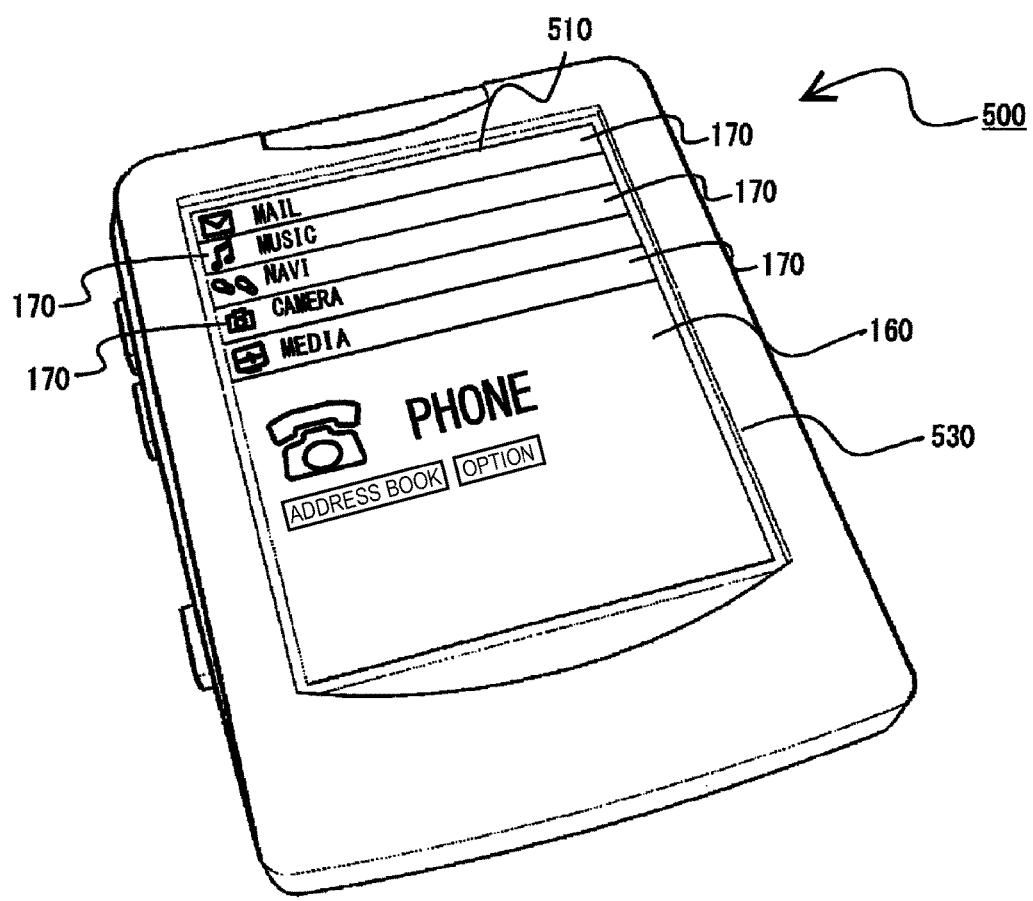
FIG. 12 shows a PDA according to a third embodiment.

A PDA 500 which is the electronic device according to a third embodiment of the present invention is described. FIG. 12 shows the PDA 500 according to the third embodiment. In the above embodiments, the cellular phones 100, 300 having the first display unit 110 and the second display unit 120 have been described. However, the present invention is not limited thereto. In other words, an electronic device having a display unit only on one side of the housing is also applicable.

As shown in FIG. 12, the PDA 500 according to the third embodiment has a single display unit 510 and a transparent touch sensor 530 that is overlapped on the display unit 510. The present invention of determining whether the touch is made in the narrow region or wide region, executing the operation with respect to the display screen and switching the active application 160 can be also applied to the PDA 50 having the single display unit 510.

In other words, the active application 160 is displayed on the display unit 510. When an operation to the touch sensor 530 is input in the narrow region, the operation is transmitted to the active application 160 (input operation on a current display screen). In addition, when an operation to the touch sensor 530 is input in the wide region, the inactive application 170 (other application) different from the active application 160 is executed.

Here, as shown in FIG. 12, the active application 160 and the inactive applications 170 are together displayed on the display unit 510, so that a user can know an application that can be switched next time. However, it is noted that the shown configuration is just exemplary. For example, the inactive applications 170 may be displayed not only in the band shapes but also in icons arranged at the end of the display unit 510.

In addition, the region (band and the like) indicating the inactive application 170 can preferably switch between display and non-display. For example, while an input is made in the narrow region to operate the active application 160, the inactive applications 170 are preferably hidden. Then, the inactive applications 170 to be switched are displayed upon input in the wide region. Thereby, even when one display unit 510 is provided, a user can easily know the inactive applications 170 to be switched and it is possible to use the screen as large as possible for the current active application 160.

The screen at switching of the active application 160 may be simply switched or may be accompanied with a screen effect like scrolling. When the screen is scrolled, if the sliding is detected for the touch in the wide region, the scroll is preferably made in the sliding direction. When the operation in the wide region dose not have specific direction, the scroll may be made in an arbitrary direction or the scroll may not be made. In addition, the scroll direction may be preset in the upper-lower direction. When the finger is slid in the scroll direction, an application may be switched, and when the sliding is performed in a different direction, another arbitrary operation may be allotted.

Fourth Embodiment

A cellular phone 600 according to a fourth embodiment of the electronic device of the invention is described. The cellular phone 600 according to the fourth embodiment has the same outer configuration as the cellular phone 100 according to the first embodiment.

(Functional Configuration)

Figure 13:
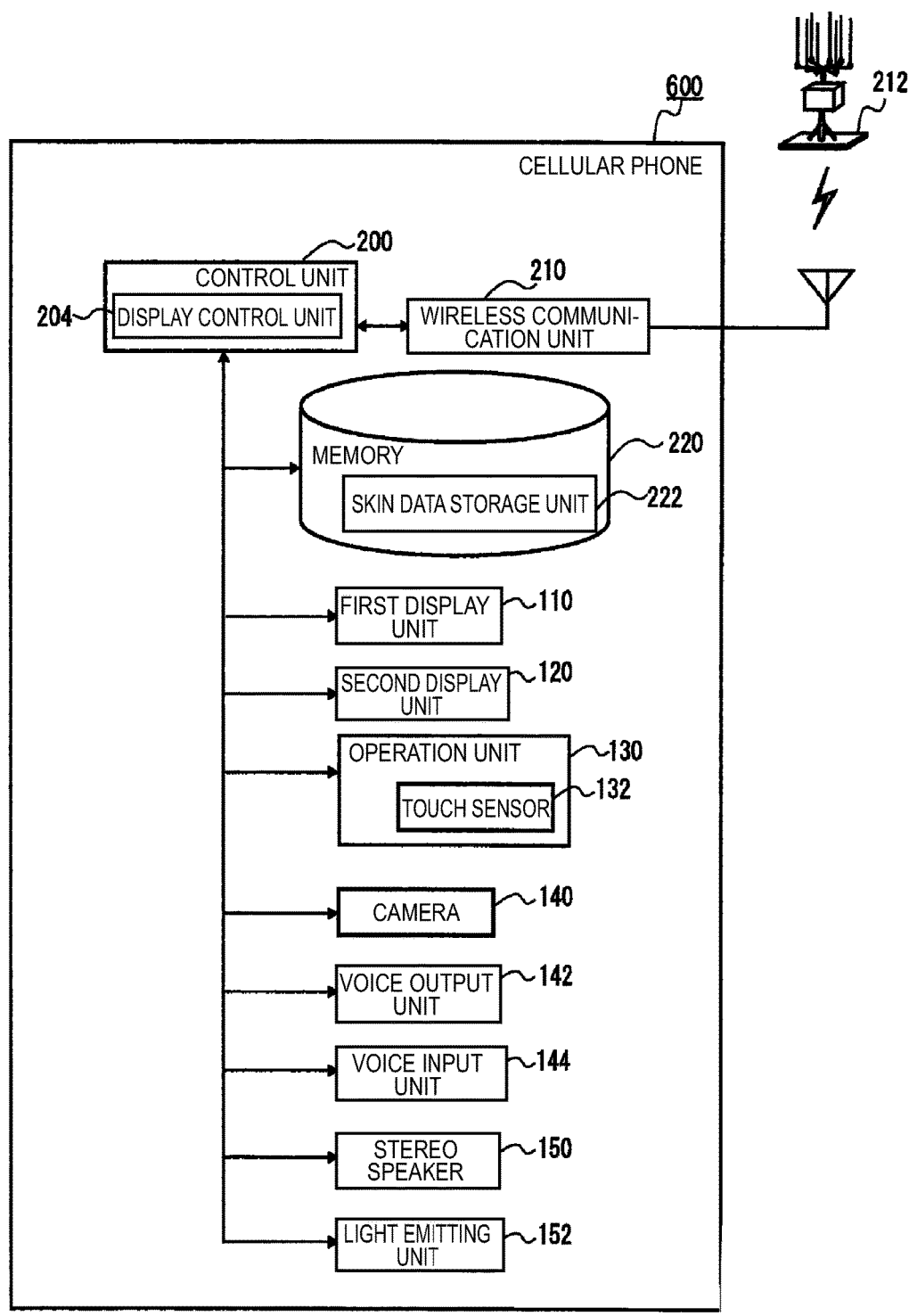
FIG. 13 is a block diagram showing schematic functions of a cellular phone according to a fourth embodiment.

FIG. 13 is a block diagram showing schematic functions of the cellular phone 600 according to the fourth embodiment. As shown in FIG. 13, the cellular phone 600 has the first display unit 110, the second display unit 120, an operation unit 130, the camera 140, the voice output unit 142, the voice input unit 144, the stereo speaker 150, a light emitting unit 152, the control unit 200, the wireless communication unit 210 and the storage unit (memory) 220.

In the fourth embodiment, the control unit 200 further includes the display control unit 204.

The display control unit 204 controls the screens that are displayed on the first display unit 110 and the second display unit 120. Specifically, the display control unit 204 displays the information about the active application on a first display region 161 of the first display unit 110. The display control unit 204 displays, on the second display unit 120, a third display region 181 that displays the information about the active application and second display regions 171 that display the information about the inactive applications (other applications), which can be switched into the active application. In the meantime, the respective second display regions 171 are based on the individual inactive applications and can be displayed to be arranged.

The display control unit 204 displays the second display regions 171 in different modes, respectively. In the fourth embodiment, the display mode includes a change in colors, a change in background patterns such as dot patterns and stripe patterns, a change in fonts and the like. The detailed descriptions thereof will be provided in the below.

In the fourth embodiment, the storage unit 220 further includes a skin data storage unit 222.

The skin data storage unit 222 stores a plurality of skin data. The skin data is data that defines an outer appearance of an application, such as window, character, button and the like. When skin data is selected on the basis of the operation of the operation unit 130, the display modes of the first display region 161 and the second display regions 171 are collectively changed, based on the skin data.

The operation unit 130 is a so-called information input means and includes a keyboard, cross keys and a moveable switch such as joystick. In the fourth embodiment, the touch sensor 132 is included as the operation unit 130 so as to realize both the enlargement of the display unit and the improvement on the operability.

In the fourth embodiment, the touch sensor 132 configures an input interface by a combination with the first display unit 110. The input interface realizes the functions corresponding to the operation keys, such as keyboard, cross keys, joystick and the like. In the meantime, the touch sensor 132 may be also overlapped on the second display unit 120 to configure the input interface.

In the fourth embodiment, based on the operation of the operation unit 130 (by setting the display control unit 204 based on the operation of the operation unit 130), the inactive applications that are displayed on the second display unit 120 as the second display regions 171 are selected. Accordingly, it is possible to perform the setting according to the user's preferences, thereby improving the operability.

The light emitting unit 152 includes a plurality of LEDs and illuminates the light to the outside through the light transmission parts 118. In the fourth embodiment, the light emitted from the light emitting unit 152 is to improve the ornamental property. Therefore, it may be possible to give colors to the lights emitted from the respective LEDs by implementing a predetermined coloring to the light emitting unit 118.

(Operation Explanation)

Figure 14A:
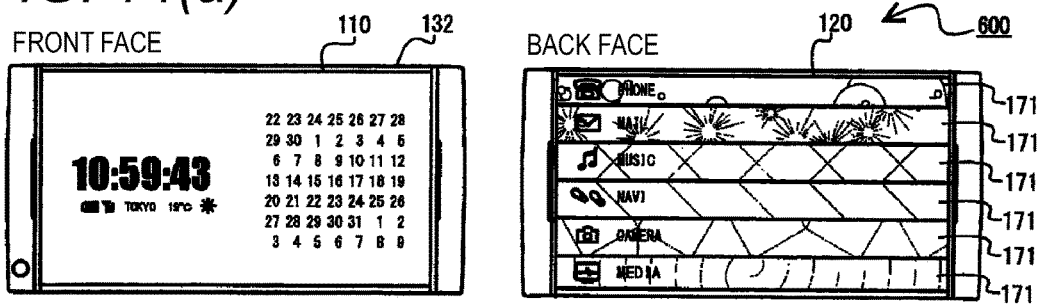
FIGS. 14(a) to 14(c) illustrate displays of a first display unit and a second display unit of the cellular phone according to the fourth embodiment when an active application is not selected.
Figure 14B:
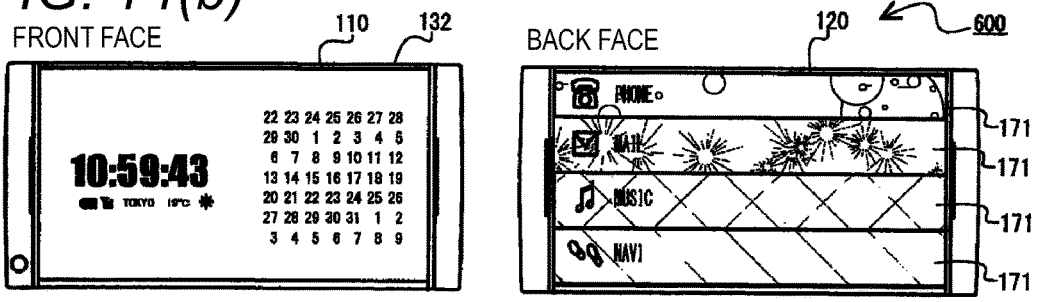
Figure 14C:
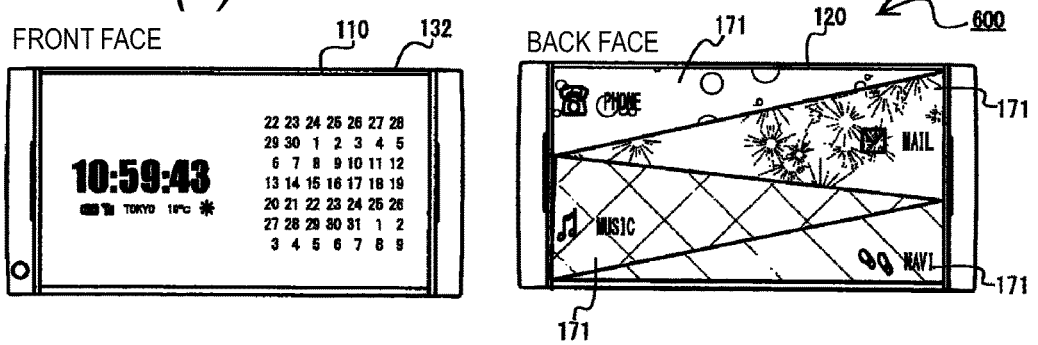

FIG. 14 illustrates displays of the first display unit 110 and the second display unit 120 of the cellular phone 600 according to the fourth embodiment when an active application is not selected. In particular, FIG. 14(*a*) shows the cellular phone 600 when a standby screen is displayed, FIG. 14(*b*) shows a case where the number of information (second display regions) about the inactive applications displayed on the second display unit 120 in FIG. 14(*a*) is reduced, and FIG. 14(*c*) shows a case where the display of the second display regions 171 of FIG. 14(*b*) is changed from the band shape to a pennant (triangular) shape.

As shown in FIG. 14(*a*), when the active application is not selected (when the cellular phone 600 starts up, and the like), a standby screen may be displayed on the first display unit 110 that is at the front side of the cellular phone 600. The standby screen is released when the operation unit 130 is operated.

At this time, the second display regions 171, which display the information about the inactive applications that can be switched into the active application, are arranged in a predetermined direction on the second display unit 120, so that they are arranged in a band shape (band shape display regions) and displayed, for example. Accordingly, a user can know the inactive applications that will be an active application. Particularly, in the fourth embodiment, since the second display regions 171 are arranged in band shapes of different modes, a user can see at a glance what application the displayed application indicates. In addition, as described above, the modes can be collectively changed by selecting the skin data stored in the skin data storage unit 222. Thus, it is possible to further improve the visibility.

In addition, as shown in FIG. 14(*b*), when the number of information about the inactive applications, which are displayed as the second display regions 171, is reduced, based on the operation of the operation unit 130, the respective display areas of the second display regions 171 are correspondingly increased. Naturally, when the number of information about the inactive applications, which are displayed as the second display regions 171, is increased, the respective display areas of the second display regions 171 are correspondingly decreased. That is, by varying the respective display areas of the second display regions 171 according to the number of information about the inactive applications, it is possible to accommodate all the second display regions 171 in the second display unit 120 whose physical area is unchanged. In addition, it is possible to know the approximate number of information about the inactive applications, which are displayed as the second display regions 171 displayed on the second display unit 120, by the display areas of the bands.

In the meantime, as shown in FIG. 14(*c*), the second display regions 171 may be displayed in pennant (triangular) display regions. It is noted that the other shapes such as trapezoid and hexagon may be adopted. By displaying the second display regions 171 in the band shapes, an effect of giving smart impression is realized when seeing the regions. However, by allowing various display modes to be selected, the visibility can be further improved.

Figure 15A:
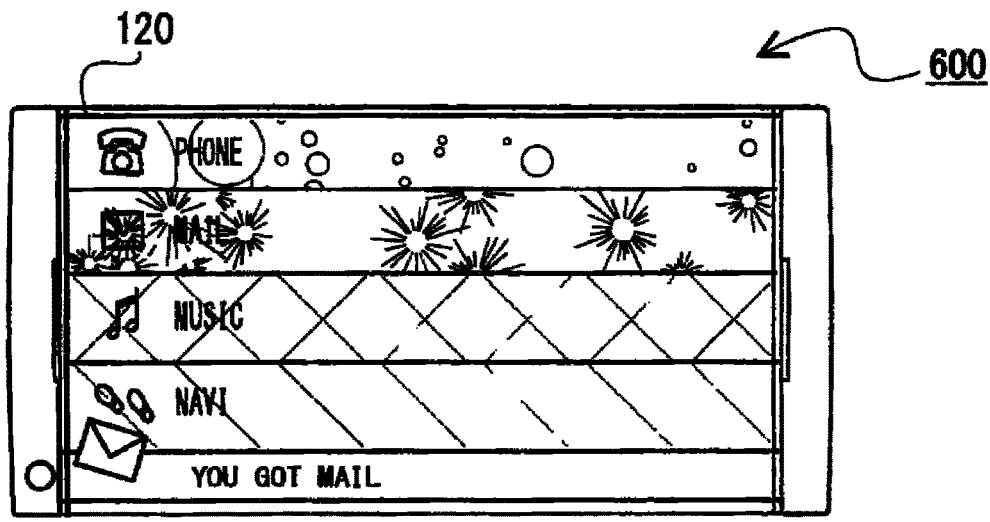
FIGS. 15(a) and 15(b) illustrate a pop-up display when a mail or incoming call is received.
Figure 15B:
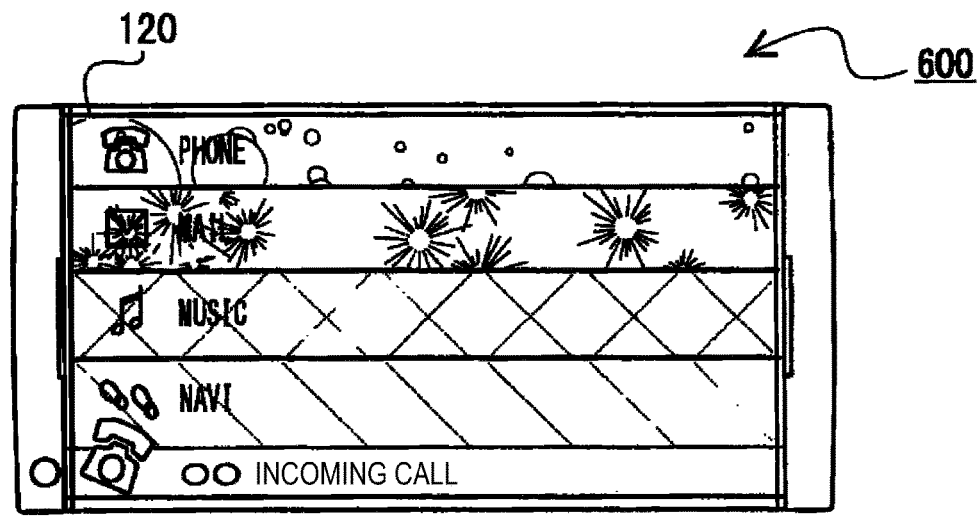

FIG. 15 illustrates a pop-up display when a mail or voice is received. As shown in FIG. 15(*a*), when the cellular phone 600 receives a mail, the reception may be displayed in a pop-up form at least on the second display unit 120 (second display region 171). Thereby, it is possible to check the reception of the mail even from the back side. Further, as shown in FIG. 15(*b*), when the cellular phone 600 receives a call, the reception may be displayed in a pop-up form at least on the second display unit 120 (second display region 171).

The switching of the active application of the cellular phone 600 according to the fourth embodiment is described with reference to FIG. 5. Here, FIG. 5(*a*) shows a display screen of the second display unit 120 and FIG. 5(*b*) shows a display screen of the first display unit 110. As shown in FIG. 5, as the operation unit 130 is operated, Phone (calling) is displayed on the first display unit 110, as the first display region 161 based on the active application. Accompanied with this, the third display region 181 is displayed on the second display unit 120 (refer to FIG. 16).

When the above operation is repeated, the active application is switched in order of Mail, Music, Navigation, Camera, Media and Phone on the first display unit, and the first display region 161 and the third display region 181 based on the respective applications are displayed therebetween (refer to FIG. 16).

In the meantime, the screen of the first display region 161 displayed on the first display unit 110 displays an icon (command) for activating (executing) a corresponding application when the application has not been activated (has not been executed) yet. This is activated (is executed) by the operation of the operation unit 130. In addition, when the application has been activated (has been executed) already, an operation screen corresponding to the state is displayed.

FIG. 16 illustrates displays of the first display unit 110 and the second display unit 120 of the cellular phone 600 according to the fourth embodiment when an active application is selected. In particular, FIG. 16(*a*) shows a case where a media application is selected as the active application, and FIG. 16(*b*) shows a case where a calling application is selected as the active application.

As shown in FIG. 16(*a*), when a media application is selected as the active application, it is displayed on the first display region 161 and the third display region 181. Although the main display about the media application should be displayed on the first display region 161 that receives an input through a combination with the touch sensor 132, the third display region 181 may display only an outline thereof. The third display region 181 on the second display unit 120 is displayed to be larger than the second display regions 171 (for example, a width is widened). In addition, the light from the light emitting unit 152 is guided to the light transmission parts 118*a* corresponding to the end portions of the third display region 181, so that the light is emitted with predetermined colors. Accordingly, since the third display region 181 on the second display unit 120 is more visible than the second display regions 171, it is possible to easily see what application the active application is.

In the meantime, when the active application is switched from the state shown in FIG. 16(*a*) by the operation of the operation unit 130, a calling application is displayed, as shown in FIG. 16(*b*). In other words, the calling application is deleted from the second display regions 171 and is newly displayed on the first display region 161 and the third display region 181.

As shown in FIG. 16(*b*), when the calling application is being executed and is displayed on the list screen, an outline is displayed which shows that the corresponding application is being executed (ACTIVE). Hence, it is possible to know an operating status of an application that is not currently active.

In addition, it may be also possible that the LEDs corresponding to the end portions of the third display region 181 emit the lights, without changing the width or mode of the third display region 181 even when the active application is switched. Specifically, the light emitting unit 152 illuminates the third display region through the light transmission parts 118a corresponding to the end portions of the new third display region 181. The light emitting unit 152 has the plurality of LEDs corresponding to the respective regions of the second display regions 171 (which are also the candidates for the third display region 181).

In the meantime, in FIG. 16, the example is shown in which one of the second display regions 171 becomes the third display region 181. However, when an application, which is not displayed as the second display regions 171, is activated, it may be possible to interrupt the third display region 181, as a new region. Also in this case, the third display region 181 may be displayed with an operating screen or outline, may be widened and may be illuminated by the LEDs. In addition, when the third display region 181 is interrupted, the width of the existing second display region 171 may be narrowed such to achieve overall balance.

In order to suppress power consumption and to thus extend operating time, when an operation is not made for predetermined time or more, the control unit 200 shifts into a stop state to stop application operations, except for some main functions such as calling function. When the operation of the cellular phone 600 starts, the control unit 200 returns from the stop state. The cellular phone 600 performs the various operations by using the touch sensor 132. However, since the touch sensor 132 is a device that detects a touch, if the return operation is executed just by detecting a touch with the touch sensor 132, the cellular phone rarely shifts into the stop state when it is put in a bag or pocket, so that the power is rapidly consumed.

In the fourth embodiment, a specific region for determining the return from the stop state is set. Specifically, as shown in FIG. 6(a), for example, the return determining region 134 is set in the lower-right part of the touch sensor 132. Then, the return is determined based on whether a touch is made only on the return determining region 134 for predetermined time or more. The return may be made when the power button 146 is pushed.

The specific example of the stop state and return made by the control unit 200 is described with reference to the flowchart of FIG. 6(b). When it is determined that the cellular phone is at the stop state, the control unit 200 determines whether only the return determining region 134 is touched for predetermined time or more (S100). When the condition is not satisfied (S100: NO), the control unit 200 continues the determination. When the condition of S100 is satisfied (S100: YES), the control unit returns (S102). At this time, the control unit 200 displays a standby screen on the first display unit 110 and a list screen on the second display unit 120.

The control unit 200 determines whether a switching operation of the active application is made or an operation for the switched active application is made on the standby screen (S104). When any operation is made (S104: YES), the control unit 200 switches or operates the active application 160 (S106), and when the process is completed, the control unit waits for a next operation (S108). When any operation is not made after the return (S104: NO) or at an operation standby state (S108), the control unit 200 determines whether an operation is not made for predetermined time (S110). When it is determined that an operation is made in S110 (S110: YES), the control unit 200 performs a corresponding process (S106), and when it is determined that an operation is not made (S110: NO), the cellular phone shifts into the stop state (S112). After the stop state, the control unit again determines whether only the return determining region 134 is touched for predetermined time or more (S100).

By the above configuration, it is possible to prevent a false operation in high precision even with the cellular phone 600 having the touch sensor 132 only. In the meantime, the control unit 200 may display a still image or moving image, which indicates a range of the return determining region 134, at the stop state As described above, according to the cellular phone 600 of the fourth embodiment, the second display regions 171 are displayed in different modes, so that it is possible to realize the favorable visibility and to improve the operability.

In the fourth embodiment, the power button 146 is provided on the end face of the end member 114. However, the end members 114, 116 themselves may be configured as a power button having a switch mechanism.

In addition, the end members 114, 116 may be provided with keys for inputting a character.

Fifth Embodiment (Outer Configuration)

A cellular phone 700 which is the electronic device according to a fifth embodiment of the present invention is described. The cellular phone 700 has the same outer configuration as the cellular phone 100 according to the first embodiment.

(Functional Configuration)

Figure 17:
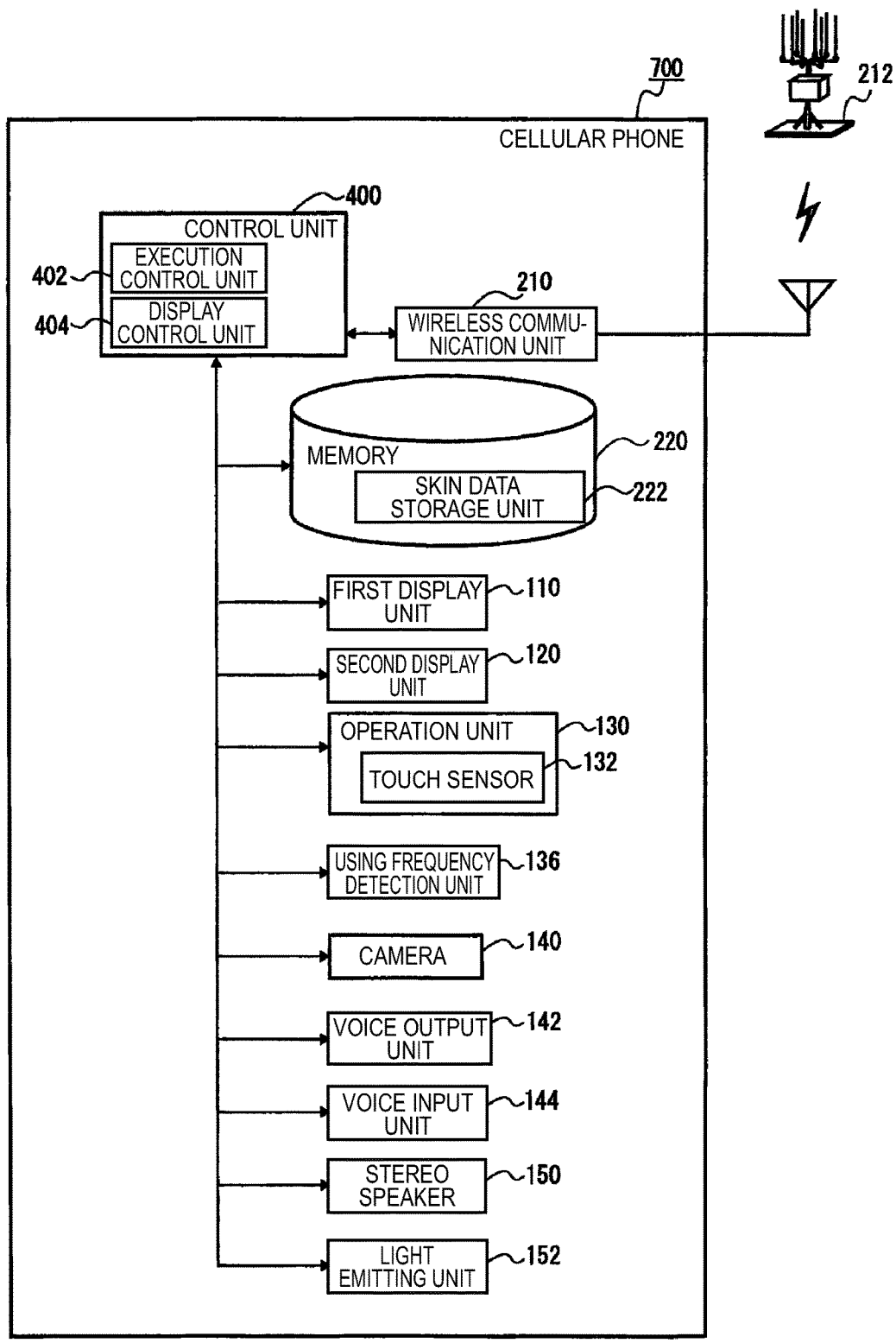
FIG. 17 is a block diagram showing schematic functions of a cellular phone according to a fifth embodiment.

FIG. 17 is a block diagram showing schematic functions of the cellular phone 700 according to the fifth embodiment. As shown in FIG. 17, the cellular phone 700 has the first display unit 110, the second display unit 120, the operation unit 130, a using frequency detection unit 136, the camera 140, the voice output unit 142, the voice input unit 144, the stereo speaker 150, the light emitting unit 152, the control unit 400, the wireless communication unit 210 and the storage unit 220.

The control unit 400 manages and controls the whole cellular phone 700 by a semiconductor integrated circuit including a central processing unit (CPU). Specifically, for example, the control unit executes applications stored in the storage unit 220, which realize a calling function, a message input function, a music reproduction function, a TV watching function and the like, and applications such as Web browser, schedule management and the like provided from an application relay server (not shown) via a communication network. The control unit 400 includes the execution control unit 402 and the display control unit 404.

The execution control unit 402 transmits an operation on the touch sensor 132 to the active application 160 (input operation on a current display screen). In addition, the execution control unit 402 executes an inactive application, which is different from the active application, by the operation on the touch sensor 132.

The display control unit 404 controls screens that are displayed on the first display unit 110 and the second display unit 120. Specifically, the display control unit 404 displays at least the first display region 161 based on the active application on the first display unit 110. Also, the display control unit 404 displays the second display regions 171 based on the inactive applications (other applications), which can be switched into the active application, on the second display unit 120. The cellular phone of the fifth embodiment is different from the cellular phone 600 of the fourth embodiment, in that the third display region 181 is not displayed and the second display regions 171 are scrolled.

The using frequency detection unit 136 detects using frequencies of the respective applications in the cellular phone 700 and transmits the same to the display control unit 404. The display control unit 404 displays the second display regions 171 based on the higher using frequencies on the second display unit 120. In the meantime, regarding the using frequency, the application having the number of using times or more in a predetermined time period may be detected or the application having a higher ranking in a predetermined time period may be detected. In addition, the configuration is not limited thereto. For example, the recently used applications (history) may be detected and displayed as the second display regions 171 on the second display unit 120. Alternatively, it may be possible to display applications, which are selected by a user, on the second display unit 120, as the second display regions 171.

The light emitting unit 152 emits the light from the inside of the housing to the outside. In the forth embodiment, the light emitting unit 152 illuminates the third display region 181. However, in the fifth embodiment, the light emitting unit may illuminate an end portion of any second display region 171, based on the setting made by a user.

(Operation Explanation)

The switching of the active application of the cellular phone 700 according to the fifth embodiment is described with reference to FIGS. 9(a) and 9(b). Here, FIG. 9(a) shows a display screen of the second display unit 120 and FIG. 9(b) shows a display screen of the first display unit 110. As described above, when the active application is not selected (when the cellular phone 100 starts up, and the like), a standby screen may be displayed on the first display unit 110 that is at the surface side of the cellular phone 700. The standby screen is released when the operation unit 130 is operated.

In the fifth embodiment, when the sliding of the touch on the touch sensor 132 is performed in the standby screen, the first display region 161 and the second display regions 171 are scrolled in the sliding direction (refer to FIG. 10).

For example, when the sliding is made in the scroll direction 501, Phone is selected as the active application and is displayed on the first display region 161. In addition, the second display region showing Phone is deleted. In addition, when the sliding is repeated in the direction, the active application is switched in order of Mail, Music, Navigation, Camera, Media and Phone (in order of the scroll direction 501). As the active application is switched, the second display regions 171 are also scrolled.

More specifically, when the active application is scrolled in the scroll direction 501, it is switched into an application located at the end (upper end) of the second display regions 171 in the scroll direction 501. As the application is newly displayed on the first display unit 110, the band indicating the corresponding application is deleted from the second display unit 120 with being scrolled in the scroll direction 501. In addition, while the application (active application) displayed on the first display unit 110 is scrolled in the scroll direction 501, it is added to the opposite end (lower end) of the second display unit 120 in the scroll direction 501. The above switching of the operation screens is performed continuously and smoothly. Accordingly, the operation is made so that the application indicated by the second display regions 171 at the back side is rotated and moved to the front side and is then displayed on the first display unit 110. Thus, it is possible to sequentially switch a plurality of applications, as if a container were rotated. In this embodiment, the scroll direction 501 has been exemplified. However, a scroll direction 502 corresponding to a reverse sliding direction is also applicable.

Figure 18A:
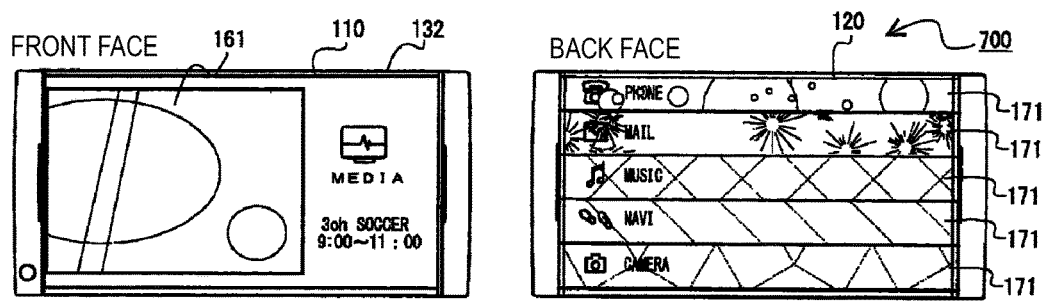
FIGS. 18(a) and 18(b) illustrate displays of a first display unit and a second display unit of the cellular phone according to the fifth embodiment when an active application is selected.

FIG. 18 shows the displays of the first display unit 110 and the second display unit 120 of the cellular phone 700 according to the fifth embodiment when the active application is selected. As shown in FIG. 18(a), for example, when a media application is selected as the active application, the second display regions 171 are scrolled, so that Phone and Camera are arranged at both ends of the second display unit 120.

Figure 18B:
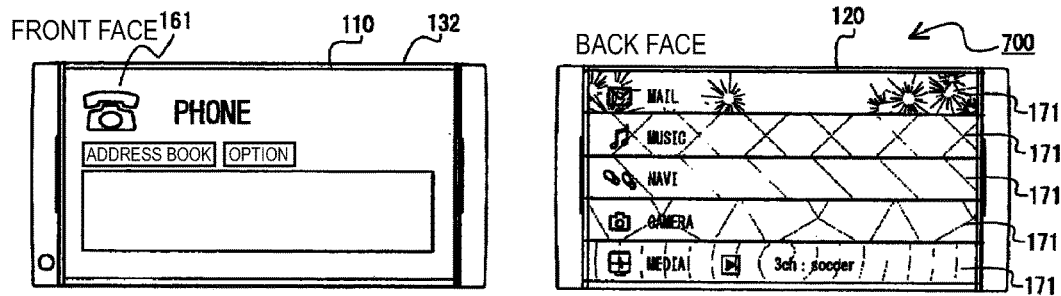

In addition, as shown in FIG. 18(b), when the sliding is further made in the scroll direction from the above state, a calling application is selected as the active application. In this case, Mail and Media are arranged at both ends of the second display unit 120.

According to the above configuration, by scrolling the bands having the different display modes, the active application can be switched, so that the operability can be improved.

Like in the fifth embodiment, when the second display unit 120 that is arranged on the different face is additionally provided in addition to the first display unit 110, the display control unit 404 may display one of the second display regions 171 on the first display unit 110 while displaying the first display region 161 on the first display unit 110 and the second display regions 171 on the second display unit 170. In other words, the display control unit may display the bands of the second display regions 171 on the first display unit 110 of the front face.

FIG. 10 illustrates a switching of an active application by sliding of the touch to the touch sensor 132. As shown in FIG. 10, in the fifth embodiment, it is assumed that the active application is switched by performing the sliding on the touch sensor 132 with both thumbs. Thereby, a user can easily perform the operation.

Figure 19A:
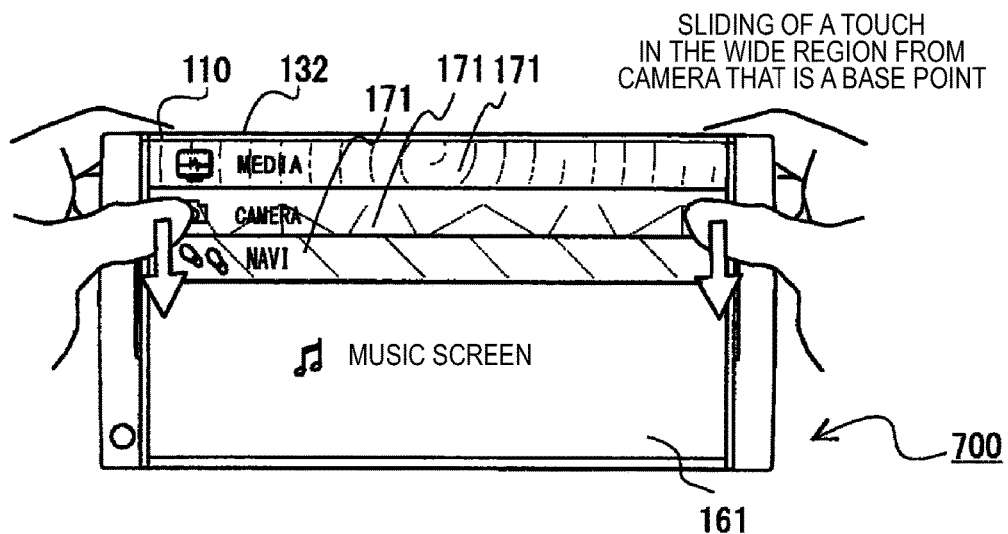
FIGS. 19(a) and 19(b) illustrate another switching method of an active application.
Figure 19B:
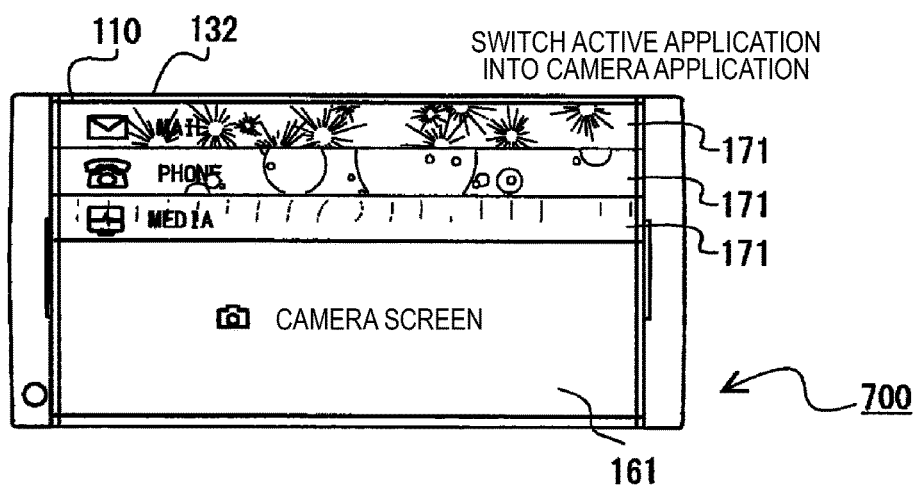

FIGS. 19(a) and 19(b) illustrate another switching method of an active application. As shown in FIGS. 19(a) and 19(b), the second display regions 171 may be displayed on the first display unit 110 and the switching may be performed by sliding the second display regions 171. That is, by sliding the touch from the band indicating the desired application as a base point (refer to FIG. 19(a)), the execution control unit 402 can switch the inactive application corresponding to the band displayed on the base point of the sliding, into the active application (refer to FIG. 19(b)). Thereby, it is possible to simply perform the switching without repeating the sliding of the touch on the touch sensor 132 until reaching the desired application. In the meantime, the second display region 171 that is displayed on the first display unit 110 may be a part of the inactive applications that are displayed on the second display unit 120, or may be an application that is separately selected.

Although preferred embodiments of the present invention have been described with reference to the drawings, the present invention is not limited thereto. It is apparent to one skilled in the art that the embodiments can be variously changed or modified within the scope defined in the claims, which are intended to be included in the technical scope of the present invention.

For example, in the above embodiments, the first display unit 110 and the second display unit 120 are connected to each other or made to be continuous by bending the short sides thereof. However, the first display unit 110 and the second display unit 120 having a flat plate shape may be used.

In the above embodiments, when the application, which has been switched into the active application 160, is not activated (is not executed) yet, the icon (command) for activating (executing) the application is displayed. However, accompanied with the switching, the control units 200, 400 may activate (execute) the application.

In the above embodiments, the touch sensor 132 is overlapped on the first display unit 110. However, the present invention is not limited thereto. For example, the touch sensor 132 may be overlapped on the second display unit 120.

In the above embodiments, the functions of Phone, Mail, Music, Navigation, Camera and Media are provided. However, only some of the functions may be provided and the other functions (for example, schedule function) may be further provided.

In the above embodiments, the cellular phone and the PDA have been exemplified as the electronic device according to the present invention. However, a computer, a digital camera, a music player, a car navigation, a television, a gaming machine, a DVD player, a remote controller and the like may be also applied in addition to the cellular phone.

Although the present invention has been described with reference to the specific embodiments, it is apparent to one skilled in the art that a variety of changes and modifications can be made without departing from the spirit and scope of the invention.

This application is based on Japanese Patent Application No. 2009-077857 filed on Mar. 26, 2009 and Japanese Patent Application No. 2009-077858 filed on Mar. 26, 2009, the disclosures of which are incorporated herein by reference

INDUSTRIAL APPLICABILITY

The present invention can be applied to an electronic device that has a touch sensor as an information input means.

DESCRIPTIONS OF REFERENCE NUMERALS

100, 300, 600, 700: cellular phone
114: end member
116: end member
118: light transmission part
110: first display unit
120: second display unit
130: operation unit
132: touch sensor
132a: outer edge region
134: return determining region
136: using frequency detection unit
140: camera
142: voice output unit
144: voice input unit
146: power button
148 (148a, 148b, 148c, 148d): sound output port
150: stereo speaker
152: light emitting unit
160: active application
161: first display region
170: inactive application (other application)
171: second display region
181: third display region
200, 400: control unit
202, 402: execution control unit
204, 404: display control unit
210: wireless communication unit
220: storage unit
212: base station
332: sliding detection unit
500: PDA
510: (single) display unit
530: touch sensor

The invention claimed is:

1. An electronic device comprising:
a first display unit; a second display unit which is different from the first display unit;
an application screen configured to display an active application, and a list screen for displaying an ordered list of inactive applications, wherein the application screen and the list screen are displayed at a same time;
a touch sensor; and
a control unit for changing a displayed active application to display an inactive application based on a touch command received via the touch sensor, wherein:
a plurality of different operations to change the displayed active application to another application are available at the same time, including a first operation and a second operation;
when the first operation to change the displayed active application to another application is made to the application screen, inactive applications displayed in the list screen are displayed in to the application screen to be activated one by one according to the order of the ordered list shown in the list screen;
when the second operation to change the displayed active application to another application is made to the list screen, inactive applications subjected to the second operation are required to always be displayed in to the application screen and activated one by one according to the order of the ordered list shown in the list screen; and
the displayed active application is displayed in the application screen while, at the same time, a band for the displayed active application is displayed in the list screen; wherein for the first operation, the application screen is provided on the first display unit while the list screen is provided on the second display unit; and wherein for the second operation, the application screen is provided on a lower part of the first display unit while the list screen is provided on an upper part of the first display unit.

2. The electronic device according to claim 1, wherein the control unit performs processing on the application screen when an operation of a single touch is made to the application screen.

3. The electronic device according to claim 1,
wherein when incoming call is received from an outside, the control unit displays the reception on the second display unit.

4. The electronic device according to claim 1, wherein by the second operation, one of the inactive applications is displayed in to the application screen and activated regardless of the order in the list screen.

5. The electronic device according to claim 1, wherein by the first operation, one of the inactive applications is displayed in to the application screen and activated according to the order in the list screen.

6. The electronic device according to claim 1, wherein the first and second operations are included in the touch command.

7. The electronic device according to claim 1, wherein the second operation is performed by performing a touch and slide operation on an inactive application.

8. The electronic device according to claim 1, wherein a width of a band for the inactive applications is narrower than a width of a band for the displayed active application.

9. The electronic device according to claim 1, further comprising: wherein for the second operation, two or more of a band for the inactive application is displayed in the list screen which is provided on the lower part of the first display unit.

10. An information processing method comprising:
a first display unit; a second display unit which is different from the first display unit;
displaying, at the same time, an active application and a list screen for that includes an ordered list of inactive applications; and
changing a displayed active application to display an inactive application based on a touch command received via a touch sensor, wherein:
  a plurality of operations to change the displayed active application to another application are available at the same time, including a first operation and a second operation;
  when the first operation to change the displayed active application to another application is made to the application screen, inactive applications displayed in the list screen are displayed in to the application screen to be activated one by one according to the order of the ordered list shown in the list screen;
  when the second operation to change the displayed active application to another application is made to the list screen, inactive applications subjected to the second operation are required to always be displayed in to the application screen and activated one by one according to the order of the ordered list shown in the list screen; and
  the displayed active application is displayed in the application screen while, at the same time, a band for the displayed active application is displayed in the list screen; wherein for the first operation, the application screen is provided on the first display unit while the list screen is provided on the second display unit; and wherein for the second operation, the application screen is provided on a lower part of the first display unit while the list screen is provided on an upper part of the first display unit.

11. The method according to claim 10, wherein a width of a band for the inactive applications is narrower than a width of a band for the displayed active application.

12. The electronic device according to claim 10, further comprising: wherein for the second operation, two or more of a band for the inactive application is displayed in the list screen which is provided on the lower part of the first display unit.

13. An electronic device comprising:
a first display unit; a second display unit which is different from the first display unit;
an application screen for displaying an active application and a list screen for displaying an ordered list of inactive applications, wherein the application screen and the list screen are displayed at a same time, wherein:
  when a first operation is made to the application screen, inactive applications displayed in the list screen are displayed in to the application screen to be activated one by one according to the order of the ordered list shown in the list screen;
  when a second operation made to one of the inactive applications in the list screen, a subjected application by the second operation is required to always be displayed in the application screen and activated one by one according to the order of the ordered list shown in the list screen; and
  the displayed active application is displayed in the application screen while, at the same time, a band for the displayed active application is displayed in the list screen; wherein for the first operation, the application screen is provided on the first display unit while the list screen is provided on the second display unit; and wherein for the second operation, the application screen is provided on a lower part of the first display unit while the list screen is provided on an upper part of the first display unit.

14. The electronic device according to claim 13, wherein the subjected application is one subjected from the inactive application in the list screen.

15. The electronic device according to claim 13, wherein the first and second operations are operated to change the displayed active application to another application.

16. The electronic device according to claim 13, wherein a width of a band for the inactive applications is narrower than a width of a band for the displayed active application.

17. The electronic device according to claim 13, further comprising: wherein for the second operation, two or more of a band for the inactive application is displayed in the list screen which is provided on the lower part of the first display unit.

\* \* \* \* \*